US007609897B2

(12) United States Patent
Oneda et al.

(10) Patent No.: US 7,609,897 B2
(45) Date of Patent: Oct. 27, 2009

(54) IMAGE CODER AND IMAGE DECODER CAPABLE OF POWER-SAVING CONTROL IN IMAGE COMPRESSION AND DECOMPRESSION

(75) Inventors: Shogo Oneda, Chiba (JP); Keiichi Suzuki, Tokyo (JP); Yukio Kadowaki, Nara (JP); Yutaka Sano, Miyagi (JP); Tooru Suino, Kanagawa (JP); Takanori Yano, Kanagawa (JP); Minoru Fukuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/099,733

(22) Filed: Apr. 8, 2008

(65) Prior Publication Data

US 2008/0212884 A1 Sep. 4, 2008

Related U.S. Application Data

(62) Division of application No. 10/658,870, filed on Sep. 9, 2003, now Pat. No. 7,372,999.

(30) Foreign Application Priority Data

Sep. 9, 2002 (JP) ............................ 2002-262243
Nov. 28, 2002 (JP) ............................ 2002-345237

(51) Int. Cl.
*G06K 9/36* (2006.01)
*G06K 9/00* (2006.01)

(52) U.S. Cl. ...................................... 382/232; 382/100
(58) Field of Classification Search ................ 382/232, 382/233, 100, 325, 240; 358/426.02, 426.03, 358/426.01; 348/14.13
See application file for complete search history.

(56) References Cited

U.S. PATENT DOCUMENTS 5,710,931 A * 1/1998 Nakamura et al. .......... 713/323

(Continued)

FOREIGN PATENT DOCUMENTS

JP 2000-092485 3/2000

(Continued)

OTHER PUBLICATIONS

Japanese Office Action, Notice of Rejection of Japanese Patent Application No. 2002-262243, Issue Date Aug. 7, 2007 (2 pages).

*Primary Examiner*—Yon Couso
(74) *Attorney, Agent, or Firm*—Blakely, Sokoloff, Taylor & Zafman LLP

(57) ABSTRACT

An image decoder comprises a code decompression/decoding unit that decodes code data produced through compression and encoding of image data, a power supply state detection unit that detects a current state of a power supply of the image decoder, and a controller that controls the code decompression/decoding unit based on the current state of the power supply so as to reduce power consumption in performing decompression and decoding of the code data.

10 Claims, 20 Drawing Sheets

U.S. PATENT DOCUMENTS

| | | | | |
|---|---|---|---|---|
| 5,734,779 | A * | 3/1998 | Okino | 386/38 |
| 6,193,422 | B1 * | 2/2001 | Belt et al. | 713/320 |
| 6,714,248 | B1 * | 3/2004 | Inoue | 348/372 |
| 6,738,093 | B1 * | 5/2004 | Kitagawa et al. | 348/231.99 |
| 6,909,372 | B2 * | 6/2005 | Iwanaga et al. | 340/660 |
| 6,978,085 | B1 * | 12/2005 | Maeda et al. | 386/112 |
| 7,000,129 | B2 * | 2/2006 | Sekine et al. | 713/320 |
| 7,372,999 | B2 * | 5/2008 | Oneda et al. | 382/232 |

FOREIGN PATENT DOCUMENTS

| | | | |
|---|---|---|---|
| JP | 2000-244919 | | 9/2000 |
| JP | 2001238189 A | * | 8/2001 |
| JP | 2001-257979 | | 9/2001 |
| JP | 2002-064710 | | 2/2002 |
| JP | 2002-135127 | | 5/2002 |
| JP | 3281423 | | 5/2002 |

\* cited by examiner

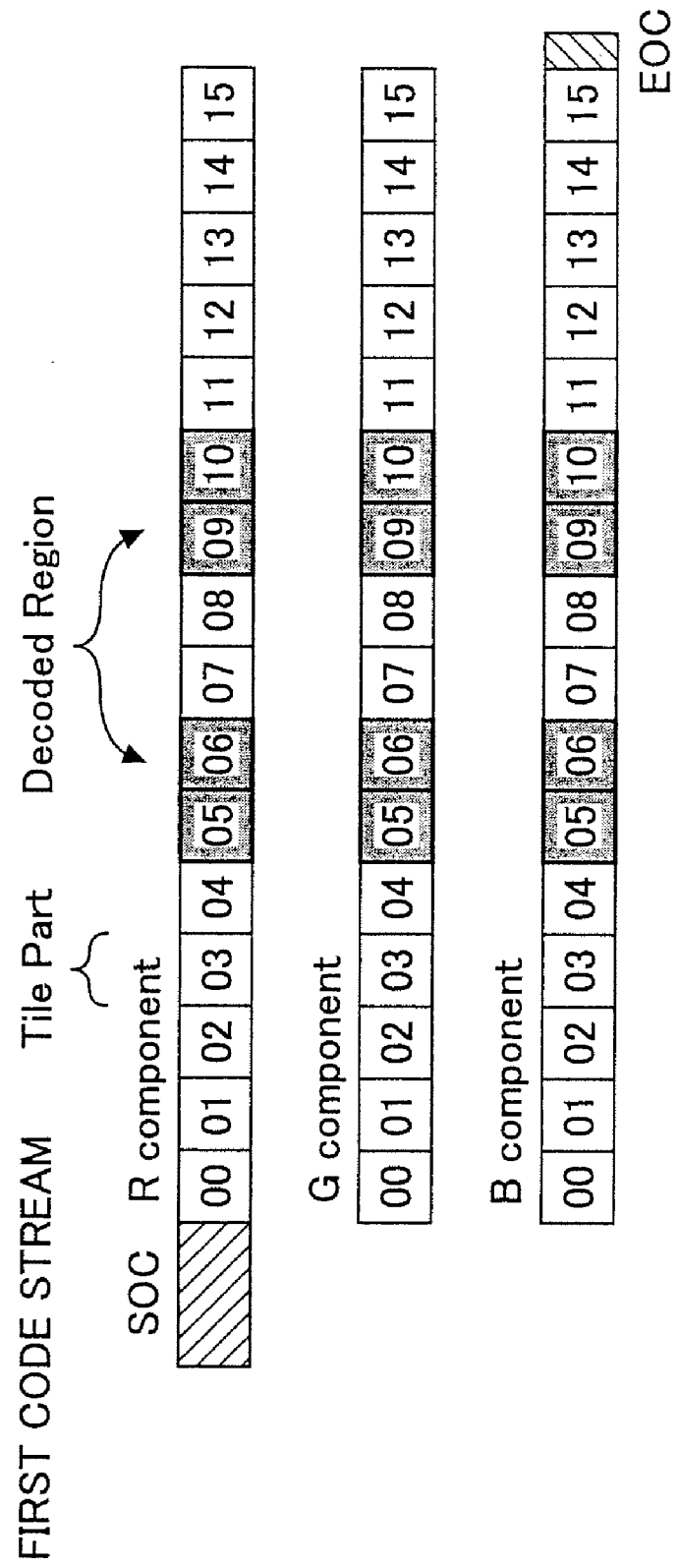

FIG.13

| POWER SUPPLY STATE (OPERATION MODE) | PROCESS MODE | CLOCK | OUTPUT VOLTAGE |
|---|---|---|---|
| AC (ORDINARY MODE) | OVERLAP 9*7 (5-LEVEL) LAGRANGIAN RATE CONTROL | 1/1 CLOCK | 3.3V |
| BATTERY CHARGE SUFFICIENT (POWER-SAVE MODE 1) | OVERLAP 9*7 (5-LEVEL) PLAIN RATE CONTROL | 1/1 CLOCK | 3.3V NO POWER SUPPLY FOR LAGRANGIAN RATE CONTROL |
| BATTERY CHARGE INSUFFICIENT (POWER-SAVE MODE 2) | NON-OVERLAP 5*3 (3-LEVEL) PLAIN RATE CONTROL | 3/4 CLOCK | 3.1V |

~34

9*7 FILTER:
HIGH FREQUENCY COMPONENT

Coef. = A1*(a−3)+A2*(a−2)+A3*(a−1)+A4*a+A5*(a+1)+A6*(a+2)+A7*(a+3)

LOW FREQUENCY COMPONENT

Coef. = B1*(a−4)+B2*(a−3)+B3*(a−2)+B4*(a−1)+B5*a+B6*(a+1)+B7*(a+2)+B8*(a+3)+B9*(a+4)

5*3 FILTER:
HIGH FREQUENCY COMPONENT

Coef. = D1*(a−1)+D2*a+D3*(a+1)

LOW FREQUENCY COMPONENT

Coef. = E1*(a−2)+E2*(a−1)+E3*a+E4*(a+1)+E5*(a+2)

3-Level Wavelet Decomposition

5-Level Wavelet Decomposition

FIG.18

| DISCARD PATTERN # | 2LL | 2HL | 2LH | 2HH | 1HL | 1LH | 1HH |
|---|---|---|---|---|---|---|---|
| 0 | 0 | 0 | 0 | 0 | 0 | 0 | 0 |
| 1 | 0 | 0 | 0 | 0 | 0 | 0 | 1 |
| 2 | 0 | 0 | 0 | 0 | 0 | 0 | 2 |
| 3 | 0 | 0 | 0 | 0 | 0 | 0 | 3 |
| 4 | 0 | 0 | 0 | 0 | 0 | 1 | 3 |
| 5 | 0 | 0 | 0 | 0 | 1 | 1 | 3 |
| 6 | 0 | 0 | 0 | 0 | 1 | 1 | 4 |
| 7 | 0 | 0 | 0 | 0 | 1 | 2 | 4 |
| 8 | 0 | 0 | 0 | 0 | 2 | 2 | 4 |
| ... | ... | ... | ... | ... | ... | ... | ... |

DISCARD ORDER TABLE

FIG.19

| 2LL 2LL 2LL 2LL | 2HL 2HL 2HL 2HL | 1HL 1HL 1HL 1HL 1HL 1HL 1HL 1HL |
|---|---|---|
| 2LL 2LL 2LL 2LL | 2HL 2HL 2HL 2HL | 1HL 1HL 1HL 1HL 1HL 1HL 1HL 1HL |
| 2LL 2LL 2LL 2LL | 2HL 2HL 2HL 2HL | 1HL 1HL 1HL 1HL 1HL 1HL 1HL 1HL |
| 2LL 2LL 2LL 2LL | 2HL 2HL 2HL 2HL | 1HL 1HL 1HL 1HL 1HL 1HL 1HL 1HL |
| 2LH 2LH 2LH 2LH | 2HH 2HH 2HH 2HH | 1HL 1HL 1HL 1HL 1HL 1HL 1HL 1HL |
| 2LH 2LH 2LH 2LH | 2HH 2HH 2HH 2HH | 1HL 1HL 1HL 1HL 1HL 1HL 1HL 1HL |
| 2LH 2LH 2LH 2LH | 2HH 2HH 2HH 2HH | 1HL 1HL 1HL 1HL 1HL 1HL 1HL 1HL |
| 2LH 2LH 2LH 2LH | 2HH 2HH 2HH 2HH | 1HL 1HL 1HL 1HL 1HL 1HL 1HL 1HL |
| 1LH 1LH 1LH 1LH 1LH 1LH 1LH 1LH | | 1HH 1HH 1HH 1HH 1HH 1HH 1HH 1HH |
| 1LH 1LH 1LH 1LH 1LH 1LH 1LH 1LH | | 1HH 1HH 1HH 1HH 1HH 1HH 1HH 1HH |
| 1LH 1LH 1LH 1LH 1LH 1LH 1LH 1LH | | 1HH 1HH 1HH 1HH 1HH 1HH 1HH 1HH |
| 1LH 1LH 1LH 1LH 1LH 1LH 1LH 1LH | | 1HH 1HH 1HH 1HH 1HH 1HH 1HH 1HH |
| 1LH 1LH 1LH 1LH 1LH 1LH 1LH 1LH | | 1HH 1HH 1HH 1HH 1HH 1HH 1HH 1HH |
| 1LH 1LH 1LH 1LH 1LH 1LH 1LH 1LH | | 1HH 1HH 1HH 1HH 1HH 1HH 1HH 1HH |
| 1LH 1LH 1LH 1LH 1LH 1LH 1LH 1LH | | 1HH 1HH 1HH 1HH 1HH 1HH 1HH 1HH |
| 1LH 1LH 1LH 1LH 1LH 1LH 1LH 1LH | | 1HH 1HH 1HH 1HH 1HH 1HH 1HH 1HH |

COEFFICIENTS OF 2-LEVEL WAVELET TRANSFORM

FIG.20A

| 0 | 1 | 2 | 3 |
|---|---|---|---|
| 4 | 5 | 6 | 7 |
| 8 | 9 | 10 | 11 |
| 12 | 13 | 14 | 15 |

COEFFICIENTS OF 2LL SUBBAND

FIG.20B

| 0 | 0 | 0 | 0 |
|---|---|---|---|
| 0 | 0 | 0 | 0 |
| 1 | 1 | 1 | 1 |
| 1 | 1 | 1 | 1 |

| 0 | 0 | 0 | 0 |
|---|---|---|---|
| 1 | 1 | 1 | 1 |
| 0 | 0 | 0 | 0 |
| 1 | 1 | 1 | 1 |

| 0 | 0 | 1 | 1 |
|---|---|---|---|
| 0 | 0 | 1 | 1 |
| 0 | 0 | 1 | 1 |
| 0 | 0 | 1 | 1 |

| 0 | 1 | 0 | 1 |
|---|---|---|---|
| 0 | 1 | 0 | 1 |
| 0 | 1 | 0 | 1 |
| 0 | 1 | 0 | 1 |

HIGHEST BIT-PLANE

LOWEST BIT-PLANE

4 BIT-PLANES OF 2LL SUBBAND

FIG.21

| | |
|---|---|
| 2LL | CODE OF THE HIGHEST BIT-PLANE |
| | ... |
| | CODE OF THE LOWEST BIT-PLANE |
| 2HL | CODE OF THE HIGHEST BIT-PLANE |
| | ... |
| | CODE OF THE LOWEST BIT-PLANE |
| 2LH | CODE OF THE HIGHEST BIT-PLANE |
| | ... |
| | CODE OF THE LOWEST BIT-PLANE |
| 2HH | CODE OF THE HIGHEST BIT-PLANE |
| | ... |
| | CODE OF THE LOWEST BIT-PLANE |
| 1HL | CODE OF THE HIGHEST BIT-PLANE |
| | ... |
| | CODE OF THE LOWEST BIT-PLANE |
| 1LH | CODE OF THE HIGHEST BIT-PLANE |
| | ... |
| | CODE OF THE LOWEST BIT-PLANE |
| 1HH | CODE OF THE HIGHEST BIT-PLANE |
| | ... |
| | CODE OF THE LOWEST BIT-PLANE |

IMAGE CODER AND IMAGE DECODER CAPABLE OF POWER-SAVING CONTROL IN IMAGE COMPRESSION AND DECOMPRESSION

This is a divisional of application Ser. No. 10/658,870, filed on Sep. 9, 2003 now U.S. Pat. No. 7,372,999, entitled "Image Coder and Image Decoder Capable of Power-Saving Control in Image Compression and Decompression," assigned to the corporate assignee of the present invention and incorporated herein by reference.

The present application claims priority to the corresponding Japanese Application Nos. 2002-262243 filed on Sep. 9, 2002 and 2002-345237 filed on Nov. 28, 2002, the entire contents of which are hereby incorporated by reference.

BACKGROUND OF THE INVENTION

1. Field of the Invention

The present invention relates to an image coder and an image decoder that are capable of efficiently reducing power consumption during compression and decompression of image data, including video data (motion picture image data) and digital still image data.

2. Description of the Related Art

A technique for performing power-saving operations for image compression in encoding video data is known. For example, Japanese patent application 2001-238189 discloses a technique for selecting appropriate resolution and/or frame rate of image data in accordance with the remaining charge of the battery, and for varying the clock rate and the power supply voltage of the associated circuit(s) based on the selected parameters, in order to reduce power consumption.

On the other hand, a new standard for image compression and decompression, JPEG 2000, is being established.

To reduce power consumption in compression of image data using algorithms of JPEG 2000, not only the resolution and the frame rate of the image data, but also other adjustable factors, such as compression rate control, tiling mode, the number of taps of the wavelet filter, and the hierarchical level of the wavelet transform, have to be taken into account. The technique disclosed in Japanese patent application 2001-238189 cannot be applied to the reduction of power consumption in image compression and decompression based on the JPEG 2000 standard because that publication does not disclose any control for the JPEG 2000 factors.

In addition, Japanese patent application 2001-238189 is directed only to power-saving control in encoding image data, and it does not address power-saving control for decompression when decoding the encoded data stream.

With the conventional techniques, all the encoded data have to be decoded, and therefore, it is difficult for the conventional techniques to reduce power consumption by reducing the amount of data to be processed.

SUMMARY OF THE INVENTION

An image coder and decoder capable of power savings control in image compression and decompression are described. In one embodiment, the image decoder comprises a code decompression/decoding unit to decode code data produced through compression and encoding of image data, a power supply state detection unit to detect a current state of a power supply of the image decoder, and a controller to control the code decompression/decoding unit based on the current state of the power supply so as to reduce power consumption in performing decompression and decoding of the code data.

BRIEF DESCRIPTION OF THE DRAWINGS

Other objects, features, and advantages of the present invention will become more apparent from the following detailed description when read in conjunction with the accompanying drawings, in which:

FIG. 6A and FIG. 6B illustrate an exemplary method for adjusting the decoded region that is to be reproduced;

FIG. 13 is a table used in the image coder shown in FIG. 11;

FIG. 18 illustrates an example of the discard order table shown in FIG. 17;

FIG. 19 illustrates a set of coefficients of 2-level wavelet transform;

FIG. 20A illustrates coefficients of 2LL subband and FIG. 20B illustrates four bit-planes of the 2LL subband; and FIG. 21 illustrates an example of a code stream obtained by encoding each bit plane, which is supplied to the code discard unit shown in FIG. 17

DETAILED DESCRIPTION OF THE EMBODIMENTS

Figure 1:
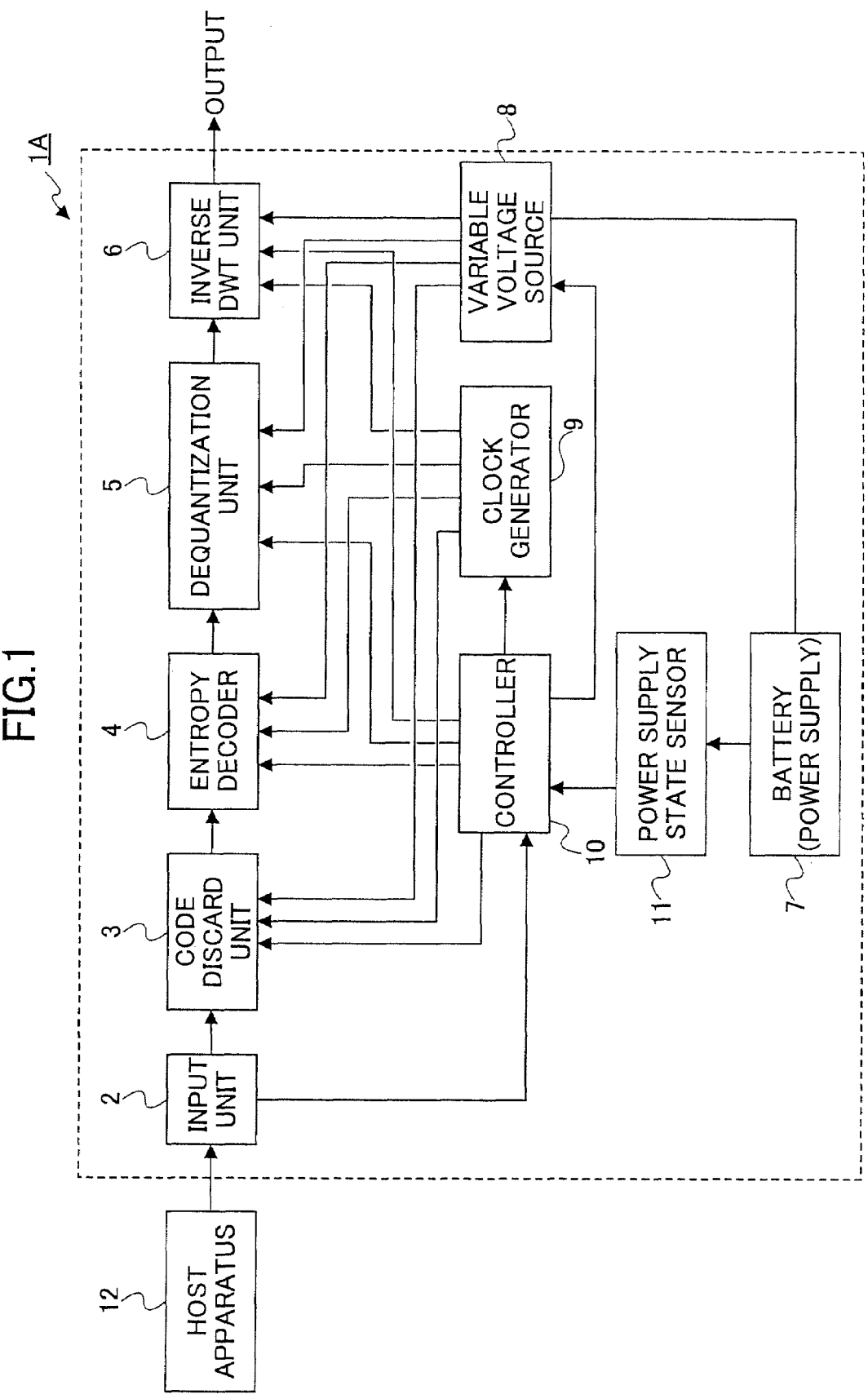
FIG. 1 is a block diagram of the image decoder according to an embodiment of the invention.

An embodiment of the present invention efficiently reduces power consumption when decoding code streams of image data. One or more embodiments of the present invention provide an efficient technique for reducing power consumption when performing compression in encoding image data. In one embodiment, an image decoder comprises a code decompression/decoding unit that decodes code data produced through compression and encoding of image data, a power supply state detection unit that detects a current state of a power supply of the image decoder, and a controller that controls the code decompression/decoding unit based on the current state of the power supply so as to reduce power consumption in performing decompression and decoding of the code data.

In one embodiment, the code decompression/decoding unit includes a code discard unit that selectively discards a portion of the code data before the code data are decoded under the control of the controller.

The controller causes the code discard unit to discard a portion of the code data so as to decrease the frame rate of the image data in order to reduce power consumption. Alternatively, the controller causes the code discard unit to discard a portion of the code data so as to decrease the resolution of the image data in order to reduce power consumption. In another alternative embodiment, the controller causes the code discard unit to discard a portion of the code data so as to decrease an image region to be displayed in order to reduce power consumption.

In one embodiment, the code decompression/decoding unit includes an image size reading unit that reads an image size from the code data before the decompression/decoding is performed, and the controller varies a standard of selective code discard based on the image size.

The image decoder may further comprise an operation mode setting unit that receives an operation mode selected by a user. When the operation mode setting unit receives the operation mode, the controller varies a standard of selective code discard based on the operation mode selected by the user, regardless of the current state of the power supply.

The image decoder may comprise a communication unit, in place of the code discard unit. In this case, the communication unit is in communication with an external apparatus that transmits the code data to the image decoder. The controller determines a standard for selectively discarding a portion of the code data based on the current state of the power supply, and instructs the external apparatus to discard a portion of the code data before the code data is transmitted to the image decoder. In this manner, the amount of data processed in decompression/decoding can be reduced, and consequently, power consumption of the image decoder is efficiently reduced.

In another embodiment of the invention, an image coder is provided. The image coder comprises an image compression/encoding unit that performs compression and encoding of an image, a power supply state detector that detects the current state of a power supply of the image coder, and a first mode setting unit that selects a processing mode for compression/encoding rate control in accordance with the current state of the power supply. In one embodiment, the first mode setting unit selects a Lagragian rate control mode when the current state of the power supply is above a reference state, and selects a plain rate control mode when the current state of the power supply is at or below the reference state.

In still another embodiment of the invention, an image coder comprises an image compression/encoding unit that divides an image into a plurality of tiles through a tiling process and performs compression and encoding of the image in a hierarchical manner for each of the tiles, a power supply state detector that detects a current state of a power supply of the image coder, and a first mode setting unit that selects a tiling mode in accordance with the current state of the power supply. In one embodiment, the first mode setting unit selects an overlap tiling mode when the current state of the power supply is above a reference state, and it selects a non-overlap tiling mode when the current state of the power supply is at or below the reference state.

In yet another embodiment of the invention, an image coder comprises an image compression/encoding unit that performs compression and encoding of an image using wavelet transform for frequency transform, a power supply state detector that detects a current state of a power supply of the image coder, and a first mode setting unit that selects a processing mode of wavelet transform in accordance with the current state of the power supply. In one embodiment, the first mode setting unit selects the number of taps of a wavelet filter, or a level of wavelet transform, in accordance with the current state of the power supply.

In this manner, workload of each component of the image data compression/encoding unit is reduced, and consequently, power consumption of the image coder can be reduced efficiently.

The preferred embodiments of the invention are described below with reference to the attached drawings.

FIG. 1 is a block diagram showing the structure of an image decoder 1A according to an embodiment of the invention. In this embodiment, the image decoder 1A treats video data having been subjected to compression and encoding based on, for example, the JPEG 2000 algorithm. The image decoder 1A receives code streams of the video data from a host apparatus 12, and decodes the code streams. The code streams are produced by dividing the video image into multiple sub-regions (i.e., tiles) and by performing compression/encoding in a hierarchical manner for each tile, which is explained in more detail below.

The image decoder 1 has an input unit 2, a code discard unit 3, an entropy decoder 4, a dequantization unit 5, an inverse discrete wavelet transform (DWT) unit 6, and a clock generator 9, which components form a code decomposition/decoding unit. The input unit 2 receives a code stream from the host apparatus 12. The code discard unit 3 selectively discards a unit of the codes contained in the received code stream, with reference to the header data or the like. The entropy decoder 4 performs entropy decoding of the code stream that has been subjected to the code discard process. The dequantization unit 5 dequantizes the entropy-decoded data. The inverse DWT unit 6 carries out inverse discrete wavelet transform (DWT) on the dequantized data, and outputs the decoded video data. The inverse DWT is a kind of inverse frequency transform for mapping the frequency series back into an original time series of a space domain.

The image decoder 1A also has a battery 7, a variable voltage source 8, a controller 10, and a power supply state sensor 11. The battery 7 is a power supply of the image decoder 1A. The variable voltage source 8 generates a variable voltage from the power supplied from the battery, and supplies the variable voltage to the input unit 2, the code discard unit 3, the entropy decoder 4, the dequantization unit 5, and the inverse DWT unit 6. Although the image decoder 1A shown in FIG. 1 uses a battery 7 as the power supply, an AC power source may be used to drive the image decoder 1A.

The clock generator 9 generates and supplies clock signals to the code discard unit 3, the entropy decoder 4, the dequantization unit 5, and the inverse DWT unit 6, based on a command from the controller 10. The controller 10 comprises, for example, a microcomputer, and controls the entire operation of the image decoder 1A. The power supply state sensor 11 detects the remaining charge of the battery 7 using a known technique.

The image decoder 1A is used in cellular phones, mobile terminals, wireless camera monitoring systems, or other image display apparatuses that receive encoded image data and display images, including motion pictures and still pictures. When the video decoder is applied to a camera monitoring system, the video data decoded by the image decoder 1A are buffered in a storage medium, such as a hard disk, and the decoded images are displayed on a monitor screen.

Figure 2:
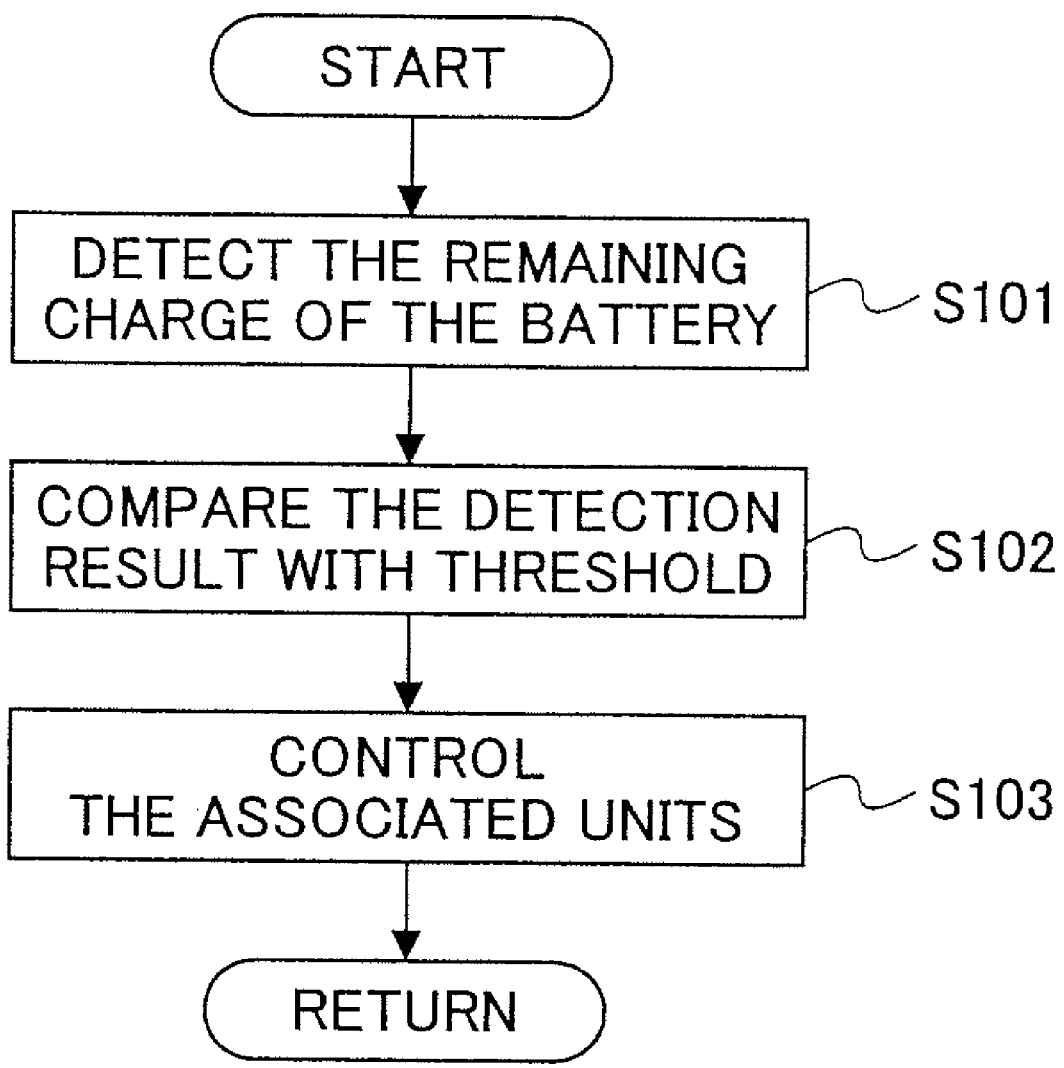
FIG. 2 is a flowchart of the operations carried out by an image decoder.

FIG. 2 is a flow diagram showing the process performed by the controller 10. The controller 10 obtains the remaining charge of the battery 7 detected by the power supply state sensor 11 (step S101). Then the controller compares the detection result with one or more prescribed threshold values (step S102). When using two or more threshold values, these threshold values are set to multiple levels indicating fractions (e.g., ¾, 2/4, and ¼) of the full charge battery state. Depending on the comparison result of step S2, the controller controls the associated units among the input unit 2, the code discard unit 3, the entropy decoder 4, the dequantization unit 5, the inverse DWT unit 6, and the clock generator 9 (step S103).

To be more precise, in step S103, the code discard unit 3 selectively discards unnecessary portions of the code stream received at the input unit 2. At the same time, the mode of the entropy decoder 4 is changed to decrease the amount of codes to be subjected to entropy decoding. The mode change of the entropy decoder 4 includes varying the frame rate of the video image and/or the amount of decoded data for each frame (by adjusting the resolution, the image quality, and the displayed regions). In response to the reduction of the data amount to be processed by the entropy decoder 4 through the mode change, the controller 10 controls the power source voltages of the entropy decoder 4, the dequantization unit 5, and the inverse DWT unit 6, as well as the frequency of the clock signals generated by the clock generator 9, to reduce power consumption at these units. Accordingly, the controller 10 also controls the variable voltage source 8 so as to decrease the output voltage level.

The above-described mode change of the entropy decoder 4 is explained in more detail below.

Figure 3:
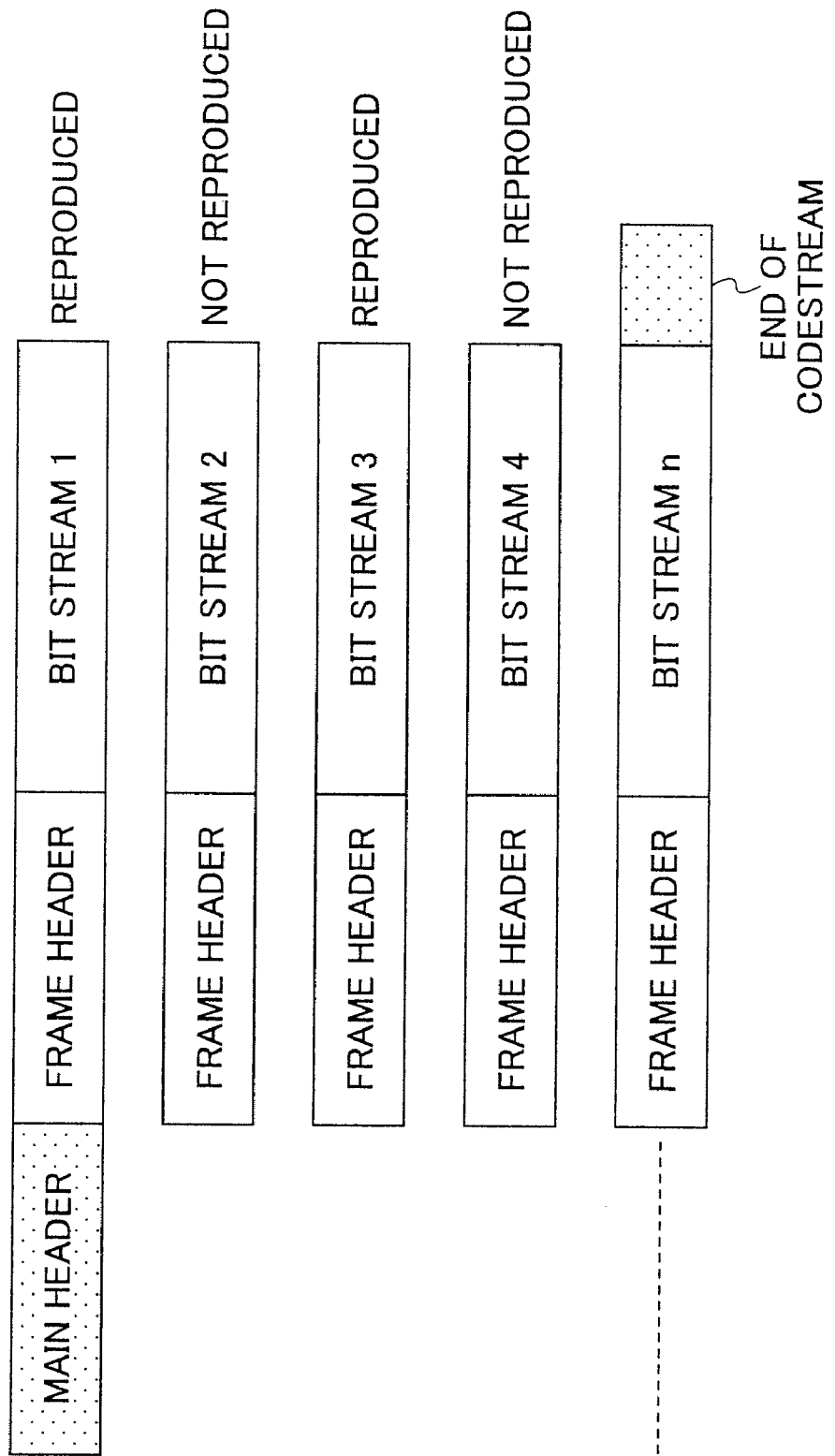
FIG. 3 is a data diagram illustrating how the frame rate is changed.

FIG. 3 is a diagram showing an example of mode change of the entropy decoder 3, in which the frame rate is controlled to reduce the amount of codes to be decoded by the entropy decoder 4. In this example, the frame rate is reduced to a half, and every other frame (or one of two adjacent frames) is reproduced. In this case, the code discard unit 3 discards the code data of non-reproduced frames. Consequently, the workload of the entropy decoder 4, the dequantization unit 5, and the inverse DWT unit 6 becomes one half (½), and the clock frequency generated by the clock generator 9 is reduced to one half. The variable voltage output from the variable voltage source 8 can be reduced, and accordingly, power consumption of the image decoder 1A can be greatly reduced as a whole.

Figure 4:
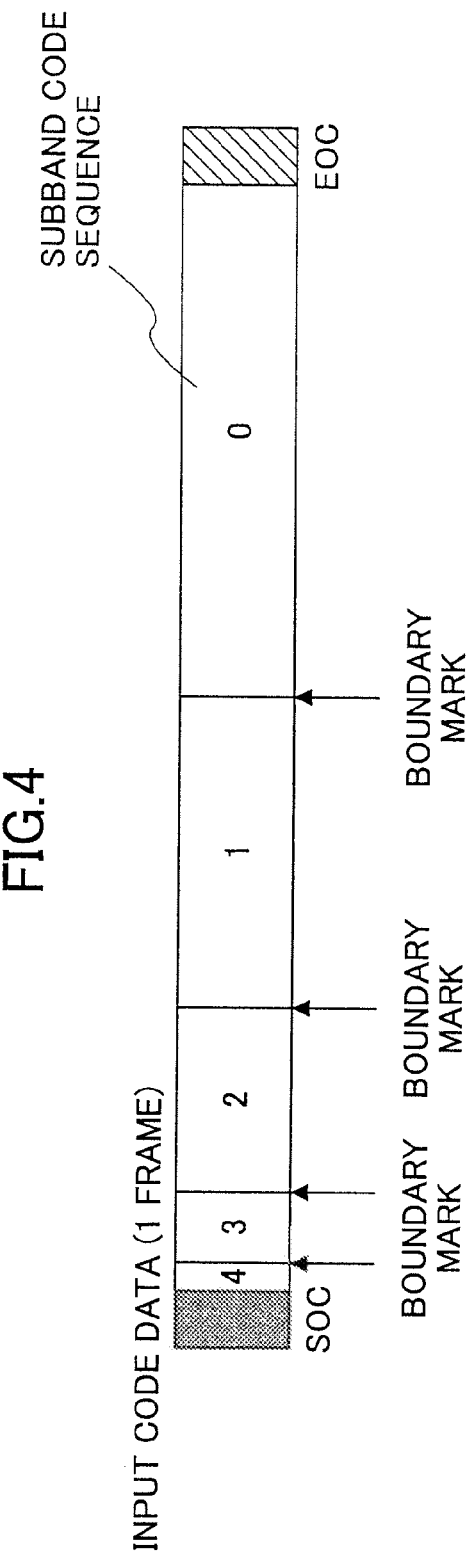
FIG. 4 is a data diagram illustrating how the resolution is changed.

FIG. 4 is a diagram showing an example of mode change of the entropy decoder 4, in which the resolution of the video image is decreased by reducing the amount of code data that are to be subjected to entropy decoding for each frame. In this example, a portion of subbands included in the frame is discarded to adjust the resolution. The code stream is input to the code discard unit 3 in order of subband code sequences 4, 3, 2, 1, and 0 arranged in this order in the frame, as illustrated in FIG. 4. A boundary mark is inserted between two adjacent subband code sequences to separate these two code sequences. The code discard unit 3 recognizes the boundaries of the subband code sequences by detecting the boundary marks, and it can selectively discard one or more subband code sequences, depending on the remaining charge of the battery 7. For example, the subbands of the frame are successively subjected to entropy decoding, starting from subband code sequence 4 (there is no significant meaning in symbol "4"). If the remaining charge of the battery 7 is sufficient, entropy decoding is carried out up to the last subband code sequence "0". On the other hand, if the remaining charge of the battery 7 is insufficient, entropy decoding is performed up to subband code sequence 1, or subband code sequence 2 or 3, depending on the remaining level of the battery 7, while discarding the rest of the subbands.

For example, the subband code sequences shown in FIG. 4 are arranged in the frame according to 5-level wavelet decomposition, and in this example, the subband code sequence "0" contains a high-frequency component, such as subbands of 1HL, 1HH and 1LH.

This arrangement can reduce the output voltage of the variable voltage source 8, as well as reducing the amount of data processed by the dequantization unit 5 and the inverse DWT unit 6. Consequently, power consumption of the image decoder 1A can be reduced greatly as a whole.

The arrangement of the subbands in each frame is not limited to the example shown in FIG. 4. Accordingly, entropy decoding does not necessarily have to be carried out from the beginning of the frame. Depending on the remaining charge of the battery, priority is given to decoding low-frequency components (or subbands), while discarding high-frequency components (or subbands) of the code data.

Figure 5:
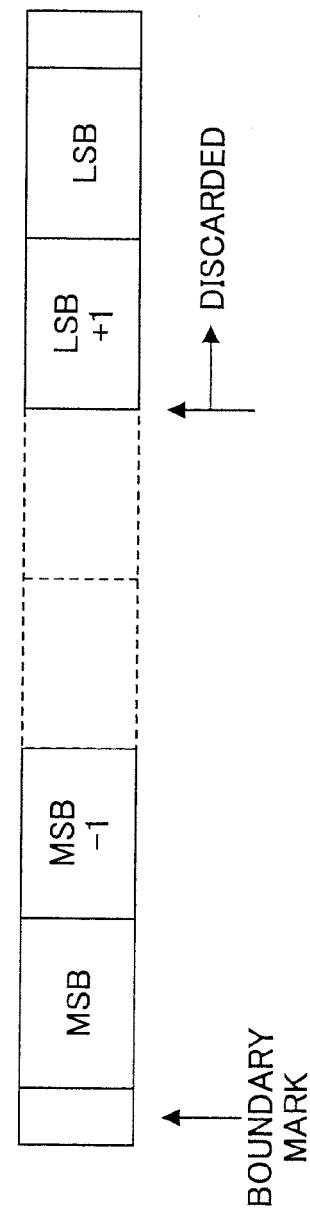
FIG. 5 is another data diagram illustrating how the resolution is changed.

FIG. 5 illustrates the data structure of a subband in the frame shown in FIG. 4. This figure shows an alternative way for reducing the amount of code data to be subjected to entropy decoding. In the subband shown in FIG. 5, encoded data are arranged to begin from the most significant bit (MSB) of the bit plane in the subband and end up at the least significant bit (LSB). Entropy decoding is carried out successively from the MSB toward the LSB. For example, the last two bit planes (that is, the LSB and the penultimate) are discarded, depending on the remaining charge of the battery. This arrangement can also reduce the amount of code data processed by the entropy decoder 4 although the amount of data processed by the dequantization unit 5 and the inverse DWT unit 6 is unchanged.

The operations explained above are applicable to non-tiled encoded data as well.

Figure 6A:
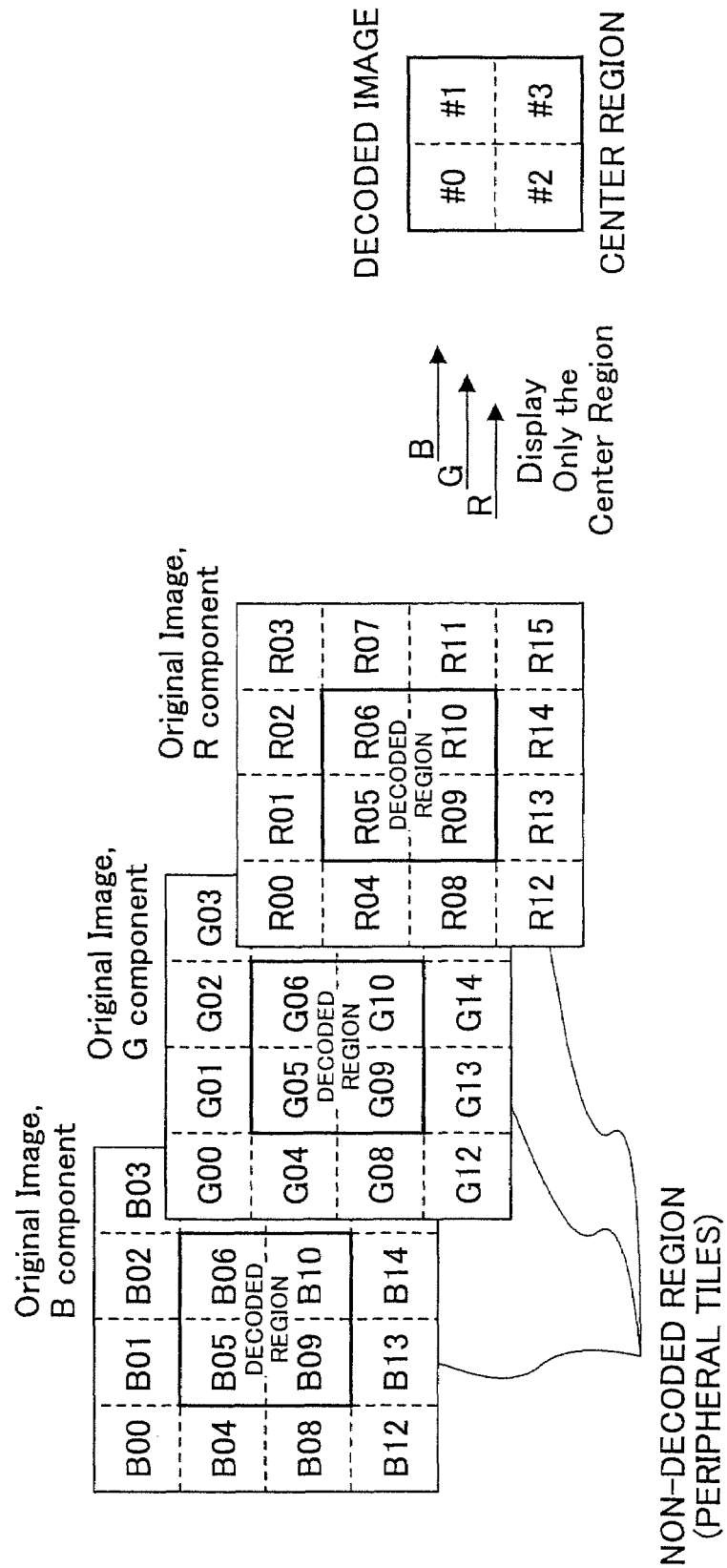

FIGS. 6A and 6B illustrate still another example of a mode change, in which the image area to be displayed on the screen is decreased to reduce the processing amount of code data. For example, entropy decoding is carried out for only the center region of the image, while the code data of the peripheral regions are discarded. In this case, only the center portion of the image is to be displayed on the screen or the display panel. In other words, the processing amount of code data is reduced by decreasing the image region to be displayed. A prescribed area of the center portion of the image (covering four center tiles in the example shown in FIG. 6A) is subjected to entropy decoding, and the rest of the tiles surrounding the center area are discarded for each of the three color components R, G, and B.

FIG. 6B illustrates code streams of red (R), green (G), and blue (B) components. The code stream of each color component includes multiple tiles (or frames). In the code stream, tiles 05, 06, 09, and 10 that cover the center region of the image are entropy-decoded, and the other tiles are skipped.

Still another example of mode change is varying the image quality to reduce the processing amount of code data. For example, regarding a color image, only luminance signals may be subjected to entropy decoding, and color difference signals may be discarded. In this case, a black-and-white image is displayed on the screen.

Figure 7:
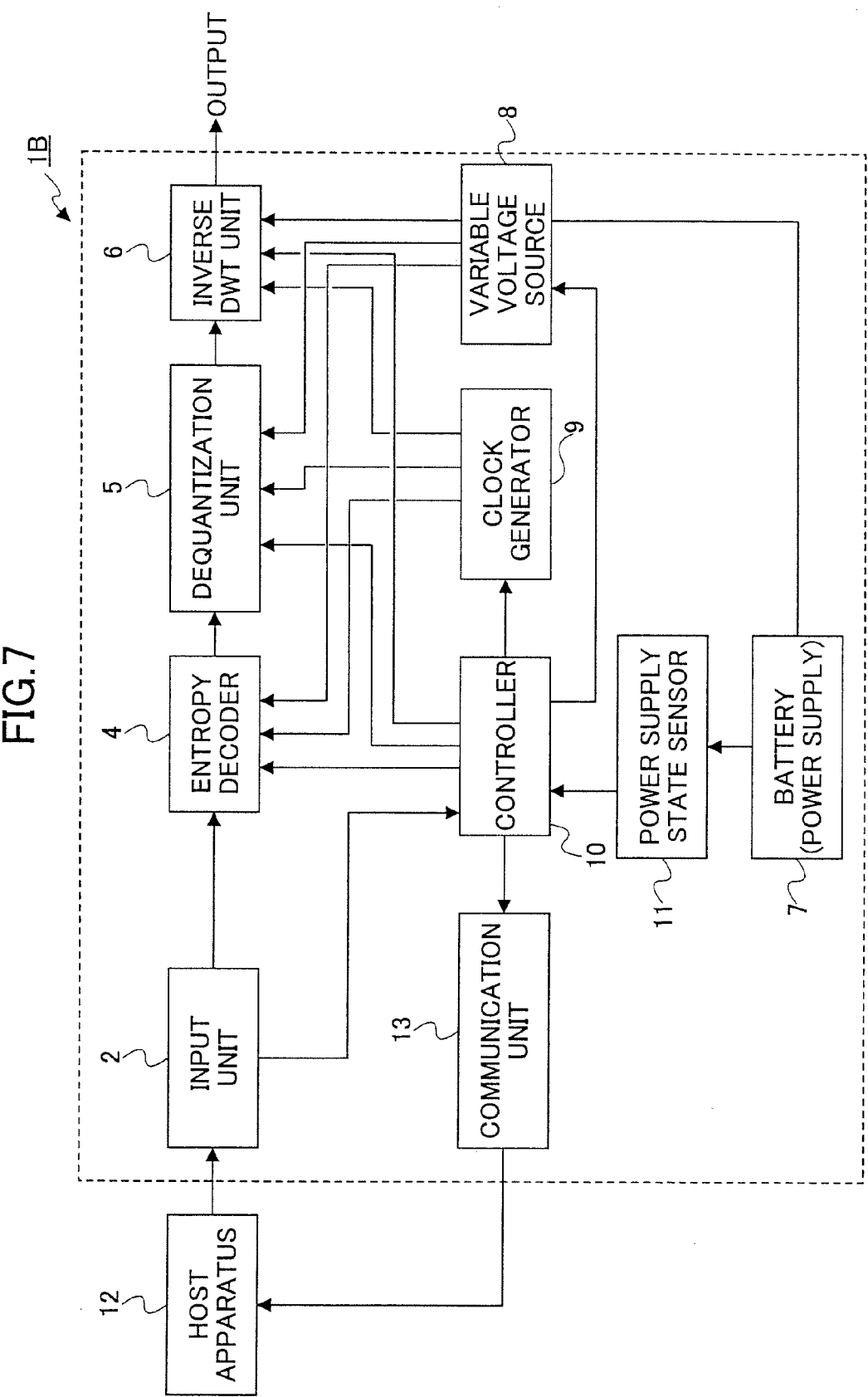
FIG. 7 is a block diagram of a modification of the image decoder shown in FIG. 1.

FIG. 7 illustrates a modification of the image decoder shown in FIG. 1. In FIG. 7, an image decoder 1B has a communication unit 13, in place of the code discard unit 3, that is used to selectively discard code data in FIG. 1. The communication unit 13 has a prescribed communication interface, and it notifies the host apparatus 12 of the code data that are to be discarded, under the control of the controller 10. In other words, the controller 10 instructs the host apparatus 12, via the communication unit 13, to discard a portion of code data when transmitting a code stream to the image decoder 1B, based on the remaining charge of the battery 7. In response to the instruction (or the notice), the host apparatus 12 creates a code stream in which a prescribed portion of code data is discarded in advance.

This arrangement is advantageous because the image decoder 1B does not have to be furnished with the code discard unit 3, and because the amount of code data processed by the input unit 2 can be reduced. Consequently, power consumption of the image decoder 1B can be achieved more efficiently.

Other components of the image decoder 1B are the same as those shown in FIG. 1, and explanation for them is omitted.

In image decoder 1A and 1B shown in FIG. 1 and FIG. 7, respectively, the controller 10 may have a table describing the relation between the power supply state and various parameters, such as the frame rate, the resolution, the image area to be displayed, the clock frequency, or the power source voltage of the variable voltage source 8.

Table 1 is an example of such a table stored in the controller 10, which defines appropriate frame rate, resolution, displayed area, clock frequency, and power source voltage, in association with various states of power supply.

TABLE 1

| POWER SUPPLY STATE | FRAME RATE | RESOLUTION | DISPLAYED AREA | CLOCK FREQUENCY | OUTPUT VOLTAGE |
|---|---|---|---|---|---|
| AC | Full Frame | Full | Whole | 1/1 Clock | 3.3 V |
| Battery Full Charge | 1/2 Frame | full | Whole | 1/2 Clock | 3.1 V |
| Battery 3/4 or Less | 1/2 Frame | 1/2 | Whole | 1/4 Clock | 2.9 V |
| Battery 2/4 or Less | 1/4 Frame | 1/2 | Whole | 1/8 Clock | 2.7 V |
| Battery 1/4 or Less | 1/4 Frame | 1/4 | Center Area Only | 1/16 Clock | 2.5 V |

The column of "power supply state" describes various levels of the power supply state. "AC" denotes that an AC power source is used. "Battery Full Charge" denotes that the remaining charge of the battery is greater than 3/4 of the 100% state battery. "Battery 3/4 or less" denotes that the remaining charge of the battery is equal to or less than 3/4 of the full state. The same applies to "Battery 2/4 or less" and "Battery 1/4 or less". In this example, the current state of the power supply is determined in a hierarchical manner using multiple thresholds set for comparison with detected result carried out in step S102 of FIG. 2. For each level of the power supply state, corresponding parameters are defined for the frame rate, the resolution, the displayed area, the clock frequency, and the output voltage of the variable voltage source 8.

The controller 10 stores this table, determines the current state of the power supply based on the comparison of step S102, and reads the corresponding values of the parameters from the table. Based on the selected values, the controller 10 controls the modes (i.e., the frame rate, the resolution, the displayed area, etc.) of the entropy decoder 4. The controller 10 also sets the clock frequency of the clock generator 9, and the output voltage of the variable voltage source 8. In this manner, power consumption in decompression/decoding can be reduced depending on the remaining charge of the battery. If the AC power supply is used, power-saving control for reducing power consumption does not have to be carried out; however, the user may select an appropriate power-saving mode, which is described below.

If the frame rate is reduced from full frame to 1/2 frame, while maintaining the resolution, the amount of code data to be processed becomes half. The clock frequency can also be reduced to half, and the output voltage of the variable voltage source can be reduced. If the resolution is reduced to 1/2, subband "0" (or high-frequency component) shown in FIG. 4 is discarded for each frame, and the amount of code data to be processed for each frame is reduced to 1/2. In addition, the data processing amount in the dequantization unit 5 and the inverse DWT unit 6 is reduced to 1/2, and the clock frequency can be set to 1/2. Thus, total power consumption can be reduced to 1/4.

The data processing amount is dependent on the circuit structure, and it may not be reduced exactly to one half (1/2). Accordingly, it is desirable to reduce the actual clock frequency as much as possible according to the circuit structure. Similarly, since the amount of code data to be processed in a frame depends on the contents of the image data, it may not be reduced exactly to one half (1/2). Accordingly, even if the clock frequency is controlled precisely in accordance with the data processing amounts in the entropy decoder 4 and the subsequent components, the decoding process may not be performed sufficiently. In this case, the decoding results are all treated as "0" or "1". As has been explained in conjunction with FIG. 4 and FIG. 5, decoding is carried out, giving priority to more important code data. Accordingly, even if code data that hasn't not been subjected to the decoding process are omitted, only lower bit plane data or lower-level subband data are missed, which may cause the tone or the resolution to be slightly changed, but will not lead to significant deterioration of image quality.

Figure 8:
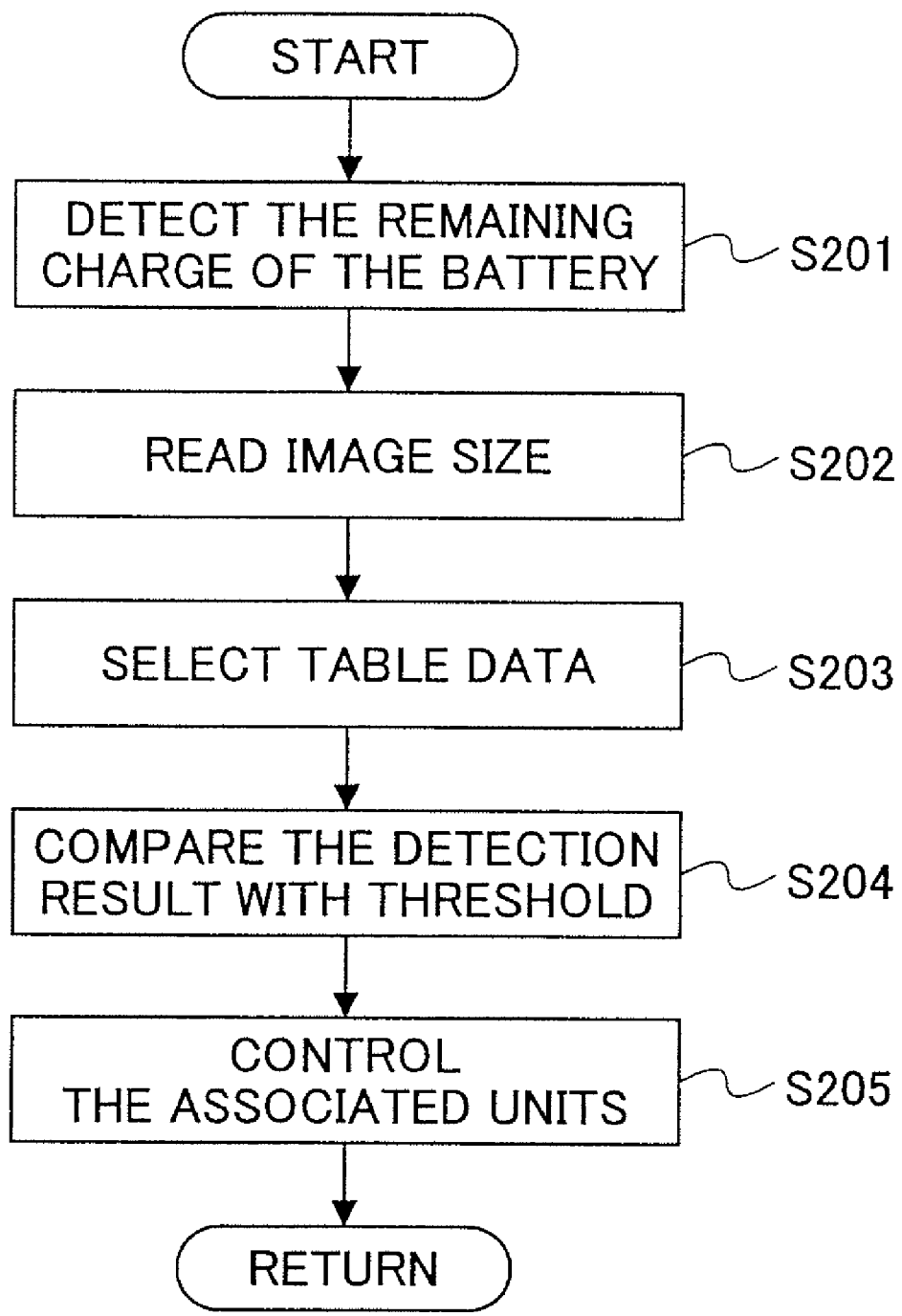
FIG. 8 is a flowchart of the operations carried out by the image decoder according to another embodiment of the invention.

FIG. 8 is a flowchart showing alternative operations of the image decoder according to another embodiment of the invention. The operations flow shown in FIG. 8 is applicable to either image decoder 1A or image decoder 1B shown in FIG. 1 and FIG. 7, respectively. In this embodiment, two types of tables are stored in the controller 10. The input unit 2 reads the image size from the code stream received from the host apparatus 12, and the controller 10 determines which table is to be used based on the detected image size.

In the operations flow shown in FIG. 8, the remaining charge of the battery 7 is detected by the power supply state sensor 11 (step S201). The input unit 2 has image size reading unit (not shown) for reading the image size from the code stream. The image size is recorded as an image attribute in the main header and the frame header of the code stream shown in FIG. 3. The input unit 2 reads the image attribute from the input code stream, and supplies the reading result to the controller 10 (step S202). The controller 10 selects an appropriate table based on the reading result that represents the image size (step S203).

For example, the controller stores Table 2, which is used to treat large-sized video images, in addition to Table 1 shown above, which is used when treating small-sized video images. Similar to Table 1, Table 2 records parameters of frame rate, resolution, displayed area, clock frequency, and output voltage of the variable voltage source 8, in association with power supply state. When the image size is large, the original video image contains more high-frequency components. Accordingly, even if the resolution is reduced, the decoded image quality is not adversely affected very much. Taking this into account, the data set defined in Table 2 is slightly different from that of Table 1.

TABLE 2

| POWER SUPPLY STATE | FRAME RATE | RESOLUTION | DISPLAYED AREA | CLOCK FREQUENCY | OUTPUT VOLTAGE |
|---|---|---|---|---|---|
| AC | Full Frame | Full | Whole | 1/1 Clock | 3.3 V |
| Battery Full Charge | Full Frame | 1/2 | Whole | 1/2 Clock | 3.1 V |
| Battery 3/4 or Less | 1/2 Frame | 1/2 | Whole | 1/4 Clock | 2.9 V |
| Battery 2/4 or Less | 1/4 Frame | 1/4 | Whole | 1/8 Clock | 2.7 V |
| Battery 1/4 or Less | 1/4 Frame | 1/4 | Center Area Only | 1/16 Clock | 2.5 V |

By selecting the appropriate table based on the image size, to what extent the code data to be selectively discarded is adjusted depending on the image size. This arrangement is advantageous because the power source voltage can be adjusted efficiently by selecting the appropriate table in accordance with the image size to be processed.

Then, the remaining charge of the battery is compared with one or more threshold values to determine the current power supply state defined in the selected table step S204). Based on the power supply state and the corresponding values of parameters, entropy decoder 4, the clock generator 9, and the variable voltage source 8, are controlled (step S205).

Figure 9:
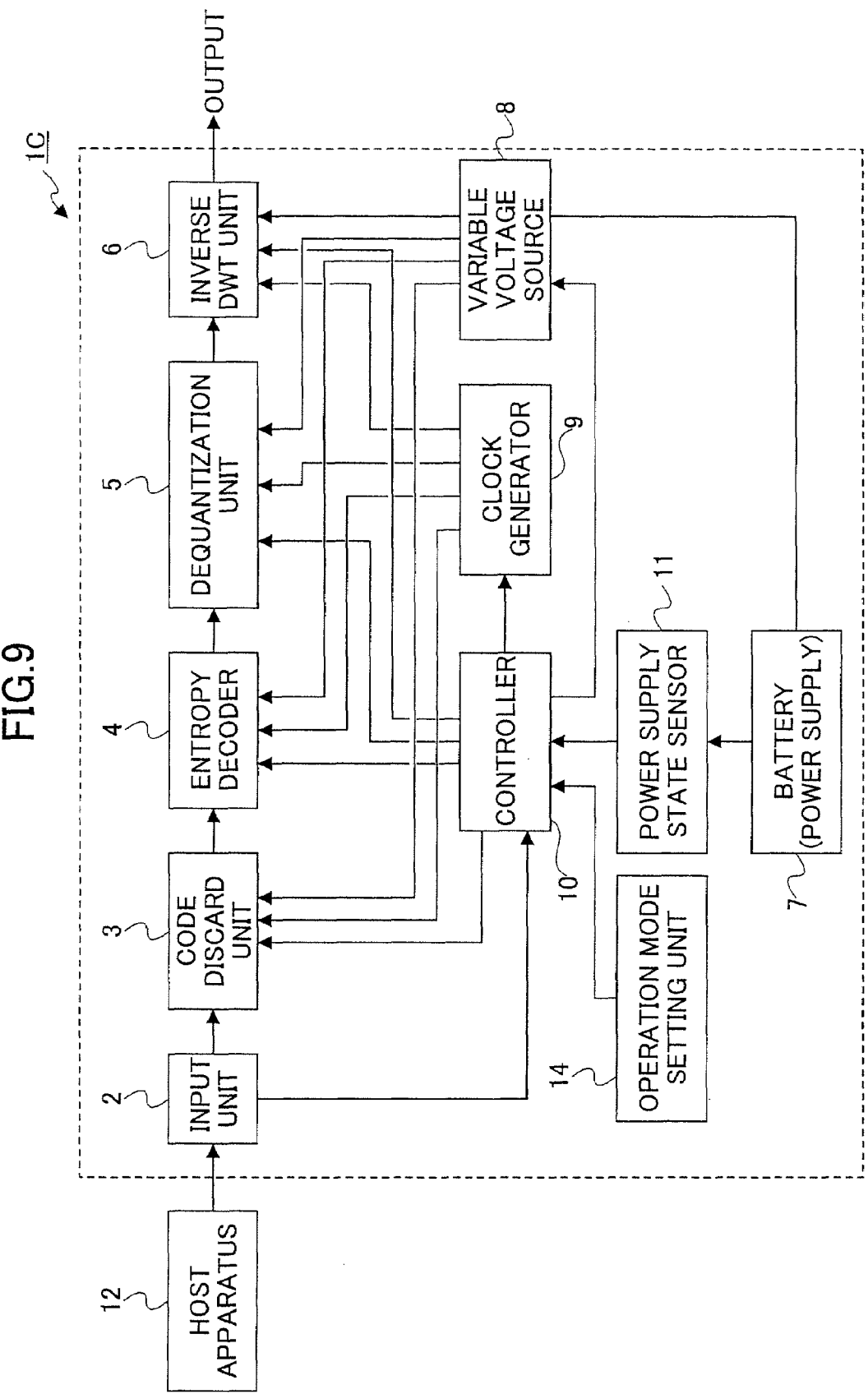
FIG. 9 is a block diagram of another modification of the image decoder.

FIG. 9 illustrates another modification of the image decoder shown in FIG. 1. Image decoder 1C shown in FIG. 9 has an operation mode setting unit 14, which accepts an operation mode setting command input by the user through manipulation of an operation panel (not shown). For instance, the user can select a desired mode from operation modes 1 through 4. The prescribed operation modes 1 through 4 are recorded in a table in advance. Table 3 is an example of such an operation mode table, which describes parameters of frame rate, resolution, displayed area, clock frequency, and output voltage of the variable voltage source 8, in association with power-saving modes 1 through 4. When power-saving mode 2 is selected, the output voltage of the variable voltage source 8 is set slightly lower. When power-saving mode 3 or 4 is selected, the output voltage of the variable voltage source 8 is set much lower.

Table 3 is also stored in the controller 10.

Figure 10:
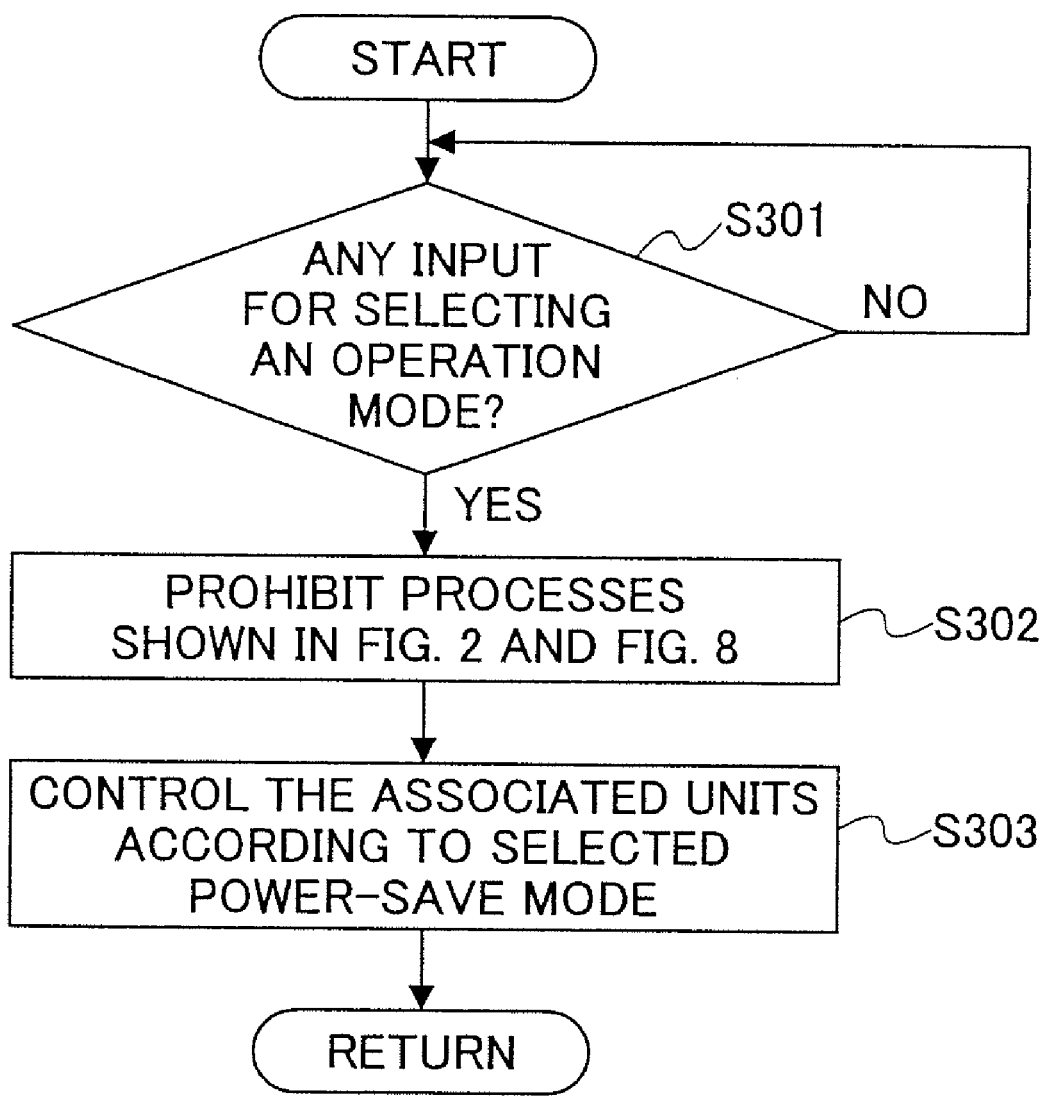
FIG. 10 is a flowchart of the operations carried out by the image decoder shown in FIG. 9.

FIG. 10 is a flowchart showing the operation carried out by the controller 10 when a power-saving mode is selected by the user. First, it is determined whether there is a user input for selecting an operation mode (step S301). If there is a user input selecting an operation mode (YES in S301), the processes shown in FIG. 2 and FIG. 8 are prohibited (step S302). The controller 10 reads Table 3, and controls the associated components so as to operate according to the parameter values of resolution, displayed area, clock frequency, and the output voltage defined in Table 3 corresponding to the selected operation mode (step S303).

Once an operation mode is selected and input by the user, mode setting of the associated components is carried out forcibly in accordance with the parameter values recorded in Table 3 because the processes shown in FIG. 2 and FIG. 7 are prohibited in step S302. In other words, a portion of code data is selectively discarded to the extent of user's selection among power-saving modes 1 through 4, regardless of the remaining charge of the battery. The user can select a desired power-saving mode, based on whether a high image quality is required even through power consumption increases, or reducing power consumption is the priority even though the image quality is slightly degraded.

With the image decoder and its modifications, power consumption can be efficiently reduced when decoding code data produced by compression/encoding of video images.

This is achieved by selectively discarding a portion of code data prior to decoding the code data.

For example, image data are divided into multiple sub-regions, and a portion of code data is discarded for each sub-region. By reducing the amount of code data to be processed for each sub-region, power consumption of the image decoder can be reduced efficiently.

TABLE 3

| POWER SUPPLY STATE | FRAME RATE | RESOLUTION | DISPLAYED AREA | CLOCK FREQUENCY | OUTPUT VOLTAGE |
|---|---|---|---|---|---|
| Power-saving mode 1 | 1/2 Frame | Full | Whole | 1/2 Clock | 3.1 V |
| Power-saving mode 2 | 1/2 Frame | 1/2 | Whole | 1/4 Clock | 2.9 V |
| Power-saving mode 3 | 1/4 Frame | 1/2 | Whole | 1/8 Clock | 2.7 V |
| Power-saving mode 4 | 1/4 Frame | 1/4 | Center Area Only | 1/16 Clock | 2.5 V |

Such a sub-region is called a tile when video image is compressed/encoded based on the JPEG 2000 algorithm. In this case, an insignificant portion of code data is discarded for each tile, thereby efficiently reducing power consumption in decoding operations.

The amount of code data to be processed may be reduced so as to decrease the frame rate.

Alternatively, the amount of code data to be processed may be reduced so as to reduce the resolution, or so as to limit the image region that is to be displayed.

By reducing the amount of code data to be processed, the frequency of the clock signal can be reduced, and power consumption of the image decoder can be efficiently reduced.

The reduced amount of code data allows the driving voltage for carrying out decomposition/decoding to be reduced, and consequently, power consumption can be efficiently reduced.

The image decoder is capable of instructing a host apparatus storing code data to selectively discard a portion of the code data prior to transmitting the code data to the image decoder. In this case, the image decoder receives the reduced amount of code data, and the workload of the image decoder can be reduced.

The image decoder can reduce power consumption efficiently, regardless of the image size.

The image decoder is capable of allowing the user to select a desired power-saving mode, depending on whether priority is given to reduction of power consumption or reproduction of a high-quality image.

Next, still another embodiment of the present invention is described.

Figure 11:
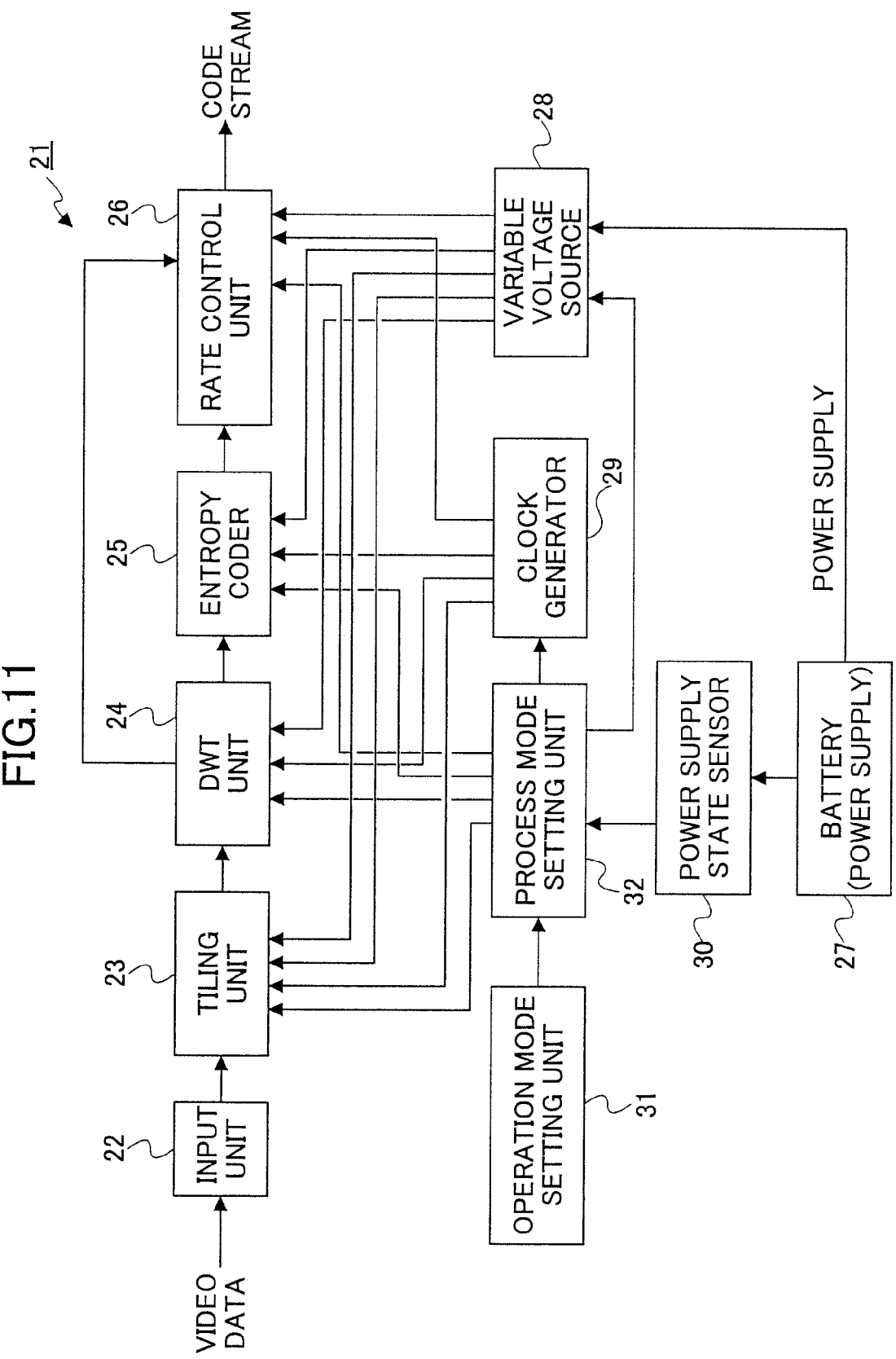
FIG. 11 is a block diagram of the image coder according to still another embodiment of the invention.

FIG. 11 is a block diagram of an image coder according to an embodiment of the invention. Image coder 21 performs compression/encoding of image data (for example, video data) based on, for example, the JPEG 2000 algorithm. With the JPEG 2000 algorithm, an image is divided into multiple sub-regions. The sub-region is named a tile, and this process is called a "tiling" process. To produce a code stream, the video image is subjected to compression/encoding for each tile in a hierarchical manner, using discrete wavelet transform (DWT) for frequency conversion.

In the image coder 21 shown in FIG. 11, an input unit 22 receives video data input to the image coder 21. The received video data are supplied to a tiling unit 23, and is subjected to a tiling process. The tiling unit 23 divides the video image into a plurality of tiles at prescribed tile size. A DWT unit 24 carries out discrete wavelet transform of the video data of each tile, using a 9*7 tap filter or a 5*3 tap filter. The wavelet transformed data are input to entropy coder 25 for each bit plane of a coefficient. The entropy coder 25 performs entropy coding of the wavelet coefficients to give additional compression. A rate control unit 26 selectively discards a portion of codes produced through the entropy coding so that the amount of codes becomes a prescribed level, and finally outputs a code stream. The tiling unit 23, the DWT unit 24, the entropy coder 25, and the rate control unit 26 constitute an image compression/encoding unit.

The image coder 21 has a battery 27, which functions as a power supply for supplying electric power to the image coder 21. Variable voltage source 28 generates a variable voltage of a prescribed level from the battery 27, and supplies the variable voltage to the input unit 22, tiling unit 23, DWT unit 24, entropy coder 25, and rate control unit 26. The image coder 21 may be driven by an AC power source, instead of the battery 27. Clock generator 29 generates clock signals, which are supplied to the tiling unit 23, the DWT unit 24, the entropy coder 25, and the rate control unit 26. The power supply state sensor 30 detects the remaining charge of the battery 27 using a known technique.

The image coder 21 further has an operation mode setting unit 31 and a process mode setting unit 32. The operation mode setting unit 31 determines an operation mode. The process mode setting unit 32 determines process modes of the tiling unit 23, the DWT unit 24, the entropy coder 25, and the rate control unit 26, respectively, based on the remaining charge of the battery 27 detected by the power supply state sensor 30 and/or the operation mode determined by the operation mode setting unit 31. The process mode set in each unit will be explained below. The process mode setting unit 32 also controls the clock generator 29 and the variable voltage source 28, and determines the frequency of the clock signal generated by the clock generator 29 and the output voltage level of the variable voltage source 28.

Figure 12:
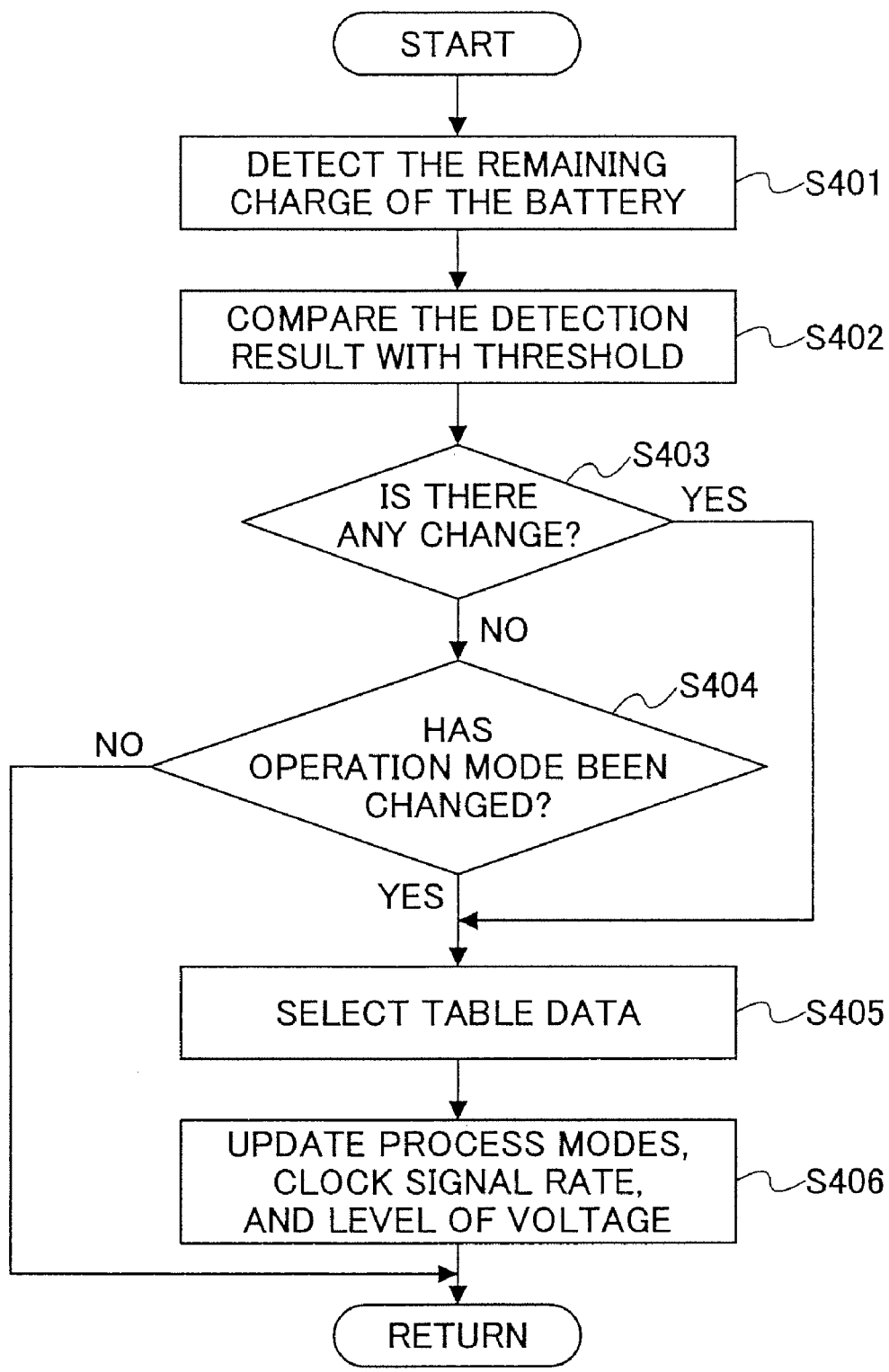
FIG. 12 is a flowchart of the operations carried out by the image coder shown in FIG. 11.

FIG. 12 is a flowchart showing the process performed by the process mode setting unit 32. The process mode setting unit 32 acquires the remaining charge of the battery 27 detected by the power supply state sensor 30 (step S401). The detection result is compared with one or more threshold values (step S402). For example, a threshold is set to ½ of the full-charged state of the battery 27. If the detection result is greater than this threshold, it is determined that the battery charge is sufficient. If the detection result is at or less than the threshold, then it is determined that the battery charge has run short.

The process mode setting unit 32 further determines whether there is any change occurring in comparison result (step S403). If there is any change occurring in comparison result (YES in S403), appropriate table data are selected from a table stored in the process mode setting unit 32, in accordance with the comparison result (step S405). An example of a change in comparison result is that the detection result has becomes at or less than the threshold, while the previous detection result was above the threshold, or that the detection result has exceeded the threshold, while the previous detection result was at or below the threshold. If there is no change in comparison result (NO in S403), then there is a determination as to whether the operation mode has been changed (step S404). If the current operation mode has been changed (YES in S404), appropriate table data are selected from the table stored in the process mode setting unit 32 (step S405). In this manner, whenever the comparison result or the operation mode has changed, the process mode setting unit 32 refers to the table, which is explained below. Then, the process mode setting unit 32 updates the process modes of the tiling unit 23, the DWT unit 24, the entropy coder 25, and the rate control unit 26, based on the table data. The process mode setting unit 32 also updates the frequency of the clock signal generated by the clock generator 29, and the output voltage level of the variable voltage source 28, based on the table data (step S406).

FIG. 13 illustrates table 34 stored in the process mode setting unit 32. In this example, table 34 describes three power-supply states, that is, a case in which an AC power source is used in the image coder 21, a case in which the battery 27 is used and the remaining charge of the battery 27 is greater than the threshold (i.e., ½ of the full-charged state), and a case in which the battery 27 is used and the remaining of the battery 27 is at or less than the threshold. In table 34, process modes, a clock frequency, and an output voltage of the variable voltage source 28 are defined in association with each of the power supply states. In addition, three operation modes, that is, "ordinary mode", "power-saving mode 1", and "power-saving mode 2" are associated with the power supply states. The "ordinary mode" corresponds to "AC", which means that an AC power source is used. "Power-saving Mode 1" corresponds to "battery charge sufficient". "Power-saving mode 2" corresponds to "battery charge insufficient".

When the power supply state is "AC", or when the operation mode is set to the "ordinary mode", the process mode for the tiling unit 23 is set to the overlap mode. In addition, the process mode for the DWT unit 24, that is, the number of taps of the filter used for discrete wavelet transform, is set to 9*7 (9-tap/7-tap filter), and the process mode for the rate control unit 26, that is, compression rate control for video image is set to the Lagragian rate control. The clock frequency of the clock generator 29 is set to a prescribed reference frequency (1/1 clock), and the output voltage of the variable voltage source 28 is set to 3.3 V.

When the power supply state is "battery charge sufficient, or when the operation mode is set to the "power-saving mode 1", then the process mode of the rate control unit 26 is set to the plain rate control mode, in place of the Lagragian rate control that requires a number of arithmetic operations, in order to reduce power consumption.

When the power supply state is "battery charge insufficient", or when the operation mode is set to the "power-saving mode 2", process modes are selected so as to further reduce power consumption. The process mode of the tiling unit 23 is set to the non-tiling mode, and the number of taps of the wavelet transform filter is set to 5*3 (5-tap/3-tap filter) for the DWT unit 24. The process mode of the rate control unit 26 is set to the plain rate control mode. In addition, the clock frequency of the clock generator 29 is decreased to ¾ clock (that is, three quarters (¾) of the reference clock frequency), and the output voltage of the variable voltage source 28 is reduced to 3.1 V, because the amount of data to be processed is reduced.

Figure 14:
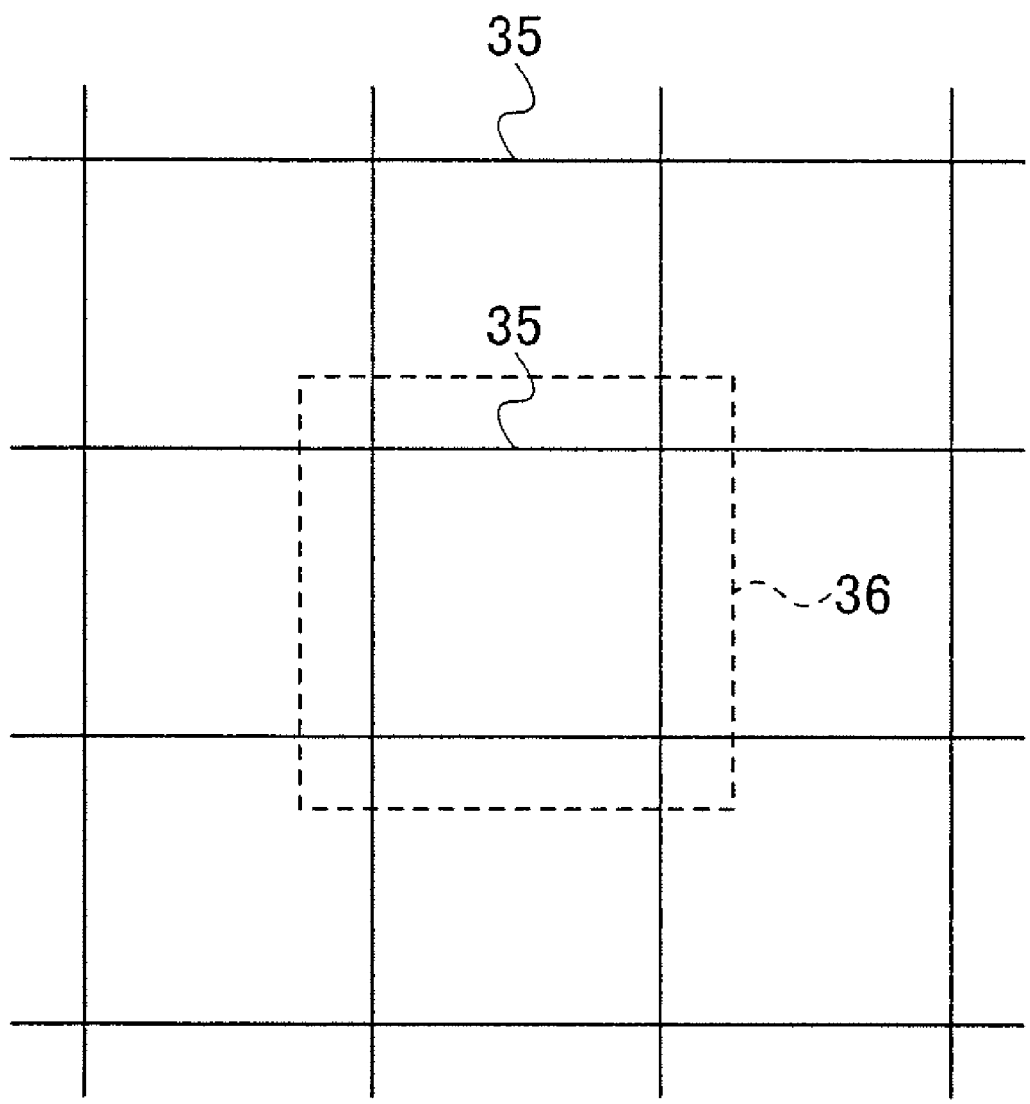
FIG. 14 is a diagram illustrating the tiling operation performed by the tiling unit shown in FIG. 11.

FIG. 14 illustrates the tiling process carried out by the tiling unit 23. The tiling unit 23 divides the image into multiple tiles 35 of a prescribed size. When the overlap mode is selected, the data in the data area 36 that overlaps the adjacent tiles of the target tile 35 are dealt with as a set of tile data. In this case, the data area 36 is larger than the target tile 35, and therefore, the amount of data to be processed for the tile area 36 becomes larger. The processing amount for data transfer and discrete wavelet transform also increase, and more electric power is required. Accordingly, the overlap mode is selected in the tiling unit 23 when the AC power source is used (or in the ordinary operation mode), or when the remaining charge of the battery is sufficient (or in the power-saving mode 1).

If the overlapped tile region is not provided, dummy data is substituted for the pixel data located near the boundary of the tile 35 and required for wavelet transform. In this case, when quantization is carried out, an error may occur in the pixel data near the tile boundary, and the tile boundary may become conspicuous. To avoid this, a filtering process is performed to improve the image quality when decoding the compression encoded data stream.

Figure 15A:
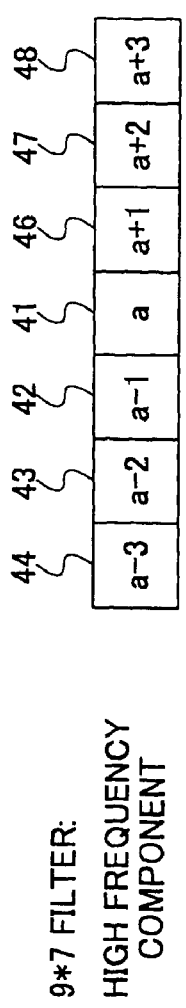
FIG. 15A and FIG. 15B illustrate a 9*7 filter.
Figure 15B:
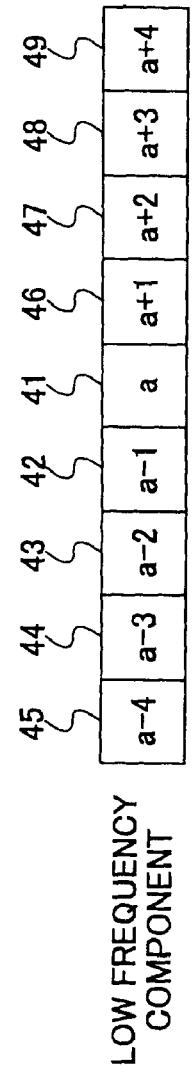

FIG. 15A through FIG. 15D illustrate wavelet tap filters used in the DWT unit 24. FIG. 15A and FIG. 15B illustrate a 9*7 (9-tap/7-tap) filter. For the high-frequency component, the target pixel 41 and the successive three pixels 42-44 and 46-48 on both sides of the target pixel 41 are processed, and data (a−3) through (a+3) of these seven pixels are subjected to multiplication and summation, using coefficients A1 through A7, as illustrated in FIG. 15A. For the low-frequency component, the target pixel 41 and the successive four pixels 42-45 and 46-49 on both sides of the target pixel 41 are processed, and data (a−4) through (a+4) of these nine pixels are subjected to multiplication and summation, using coefficients B1 through B9, as illustrated in FIG. 15B.

Figure 15C:
FIG. 15C and FIG. 15D illustrate a 5*3 filter used in the wavelet transform unit shown in FIG. 11.
Figure 15D:
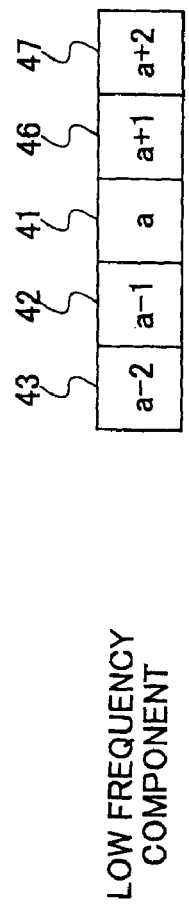

FIG. 15C and FIG. 15D illustrate a 5*3 (5-tap/3-tap) filter. For the high-frequency component, the target pixel 41 and the adjacent pixels 42 and 46 are processed, and data (a−1), a, (a+1) of these three pixels are subjected to multiplication and summation, using coefficients D1, D2, and D3, as illustrated in FIG. 15C. For the low-frequency component, the target pixel 41 and adjacent pixels 42, 43, 46, and 47 are processed, and data (a−2), (a−1), a, (a+1), and (a+2) of the five pixels are subjected to multiplication and summation, using coefficients E1 through B5, as illustrated in FIG. 15D.

In the 9*7 tap filter, sixteen iterations of multiplication and summation of the multiplication results are carried out. In the 5*3 tap filter, eight iterations of multiplication and summation of the multiplication results are carried out. Thus, the amount of arithmetic operation of the 9*7 tap filter is almost twice that of the 5*3 tap filter. To this end, the 9*7 tap filter is used when the AC power source is used (or in the ordinary mode), or the remaining of the battery 27 is sufficient (or in the power-saving mode 1), while the 5*3 tap filter is used when the remaining charge of the battery is insufficient (or in the power-saving mode 2).

Figure 16A:
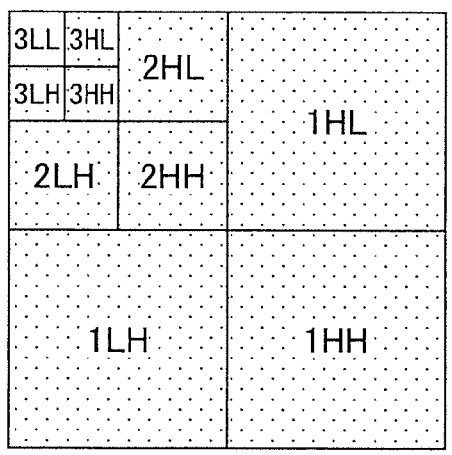
FIG. 16A illustrates 3-level wavelet decomposition.
Figure 16B:
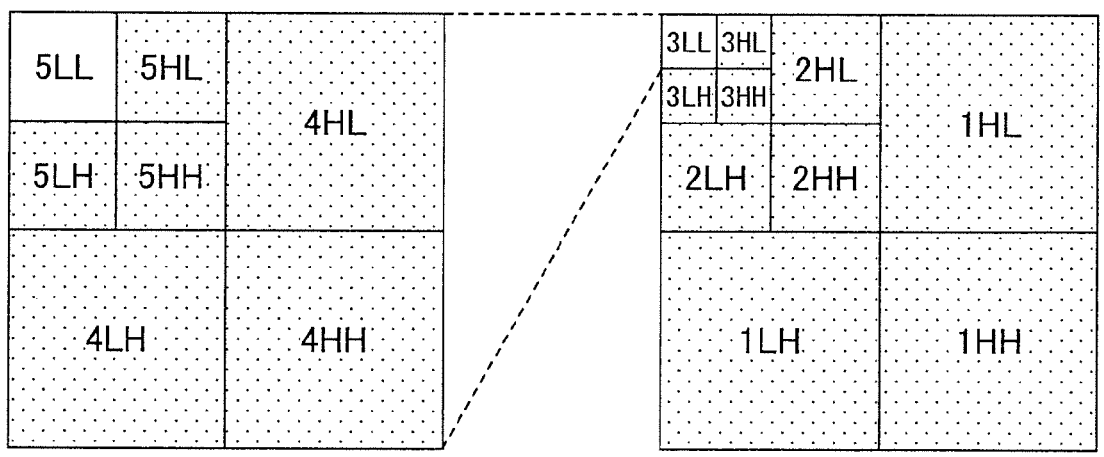
FIG. 16B illustrates 5-level wavelet decomposition performed in the wavelet transform unit shown in FIG. 11.

The processing amount of the DWT unit 24 can also be reduced by reducing the number of levels of the hierarchical operation. FIG. 16A illustrates 3-level wavelet decomposition, and FIG. 16B illustrates 5-level wavelet decomposition. In 5-level wavelet decomposition, additional coefficients for the subbands of 4HL, 4LH, 4HH, 5HL, 5LH, 5HH, and 5LL have to be calculated, as compared with 3-level wavelet decomposition. Consequently, the processing amount of the combination of the 5*3 tap filter and 3-level wavelet decomposition is much less than the combination of the 9*7 tap filter and 5-level wavelet decomposition. When employing the former, power consumption is greatly reduced.

Figure 17:
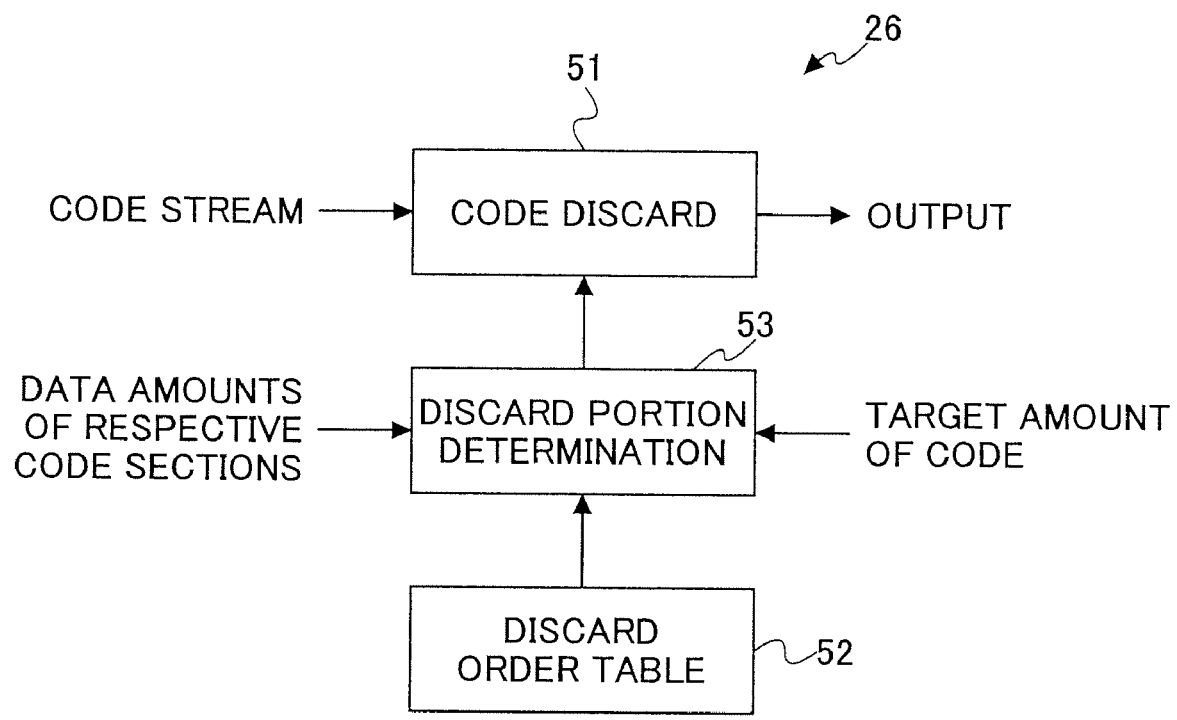
FIG. 17 illustrates the plain rate control carried out by the rate control unit shown in FIG. 11.

FIG. 17 illustrates plain rate control carried out by the rate control unit 27 when the plain rate control mode is selected. The rate control unit 26 has a code discard unit 51, a discard table 52, and a discard portion determination unit 53. The code discard unit 51 discards a portion of code stream supplied from the entropy coder 25 in prescribed order, so that the data amount of the code stream becomes a target code amount. The discard portion determination unit 53 determines which portion of the code stream is to be discarded, based on the data amounts of the respective code sections, the table data of the discard order table 52, and the target amount of code. The discard order table 52 describes the discard order arranged from the least significant data.

FIG. 18 illustrates an example of the code discard table 52. The code discard table 52 describes various discard patterns, in which a portion to be discarded is defined from the less significant portions. To be more precise, each pattern defines the number of bit-planes to be discarded for each subband. The discard patterns are arranged in the table from no code discard to a larger portion of code discard. For example, with pattern "0", no code discard is performed, and the encoded code stream is output as it is. With pattern "4", 3 bits of 1HH subband and one bit of 1LH subband are discarded. The number of bit planes to be discarded is determined in advance based on the significance with respect to the image quality. The amount of data of the code stream from which a portion of bit-planes have been discarded is calculated in order of the discard pattern numbers, and the discard pattern with which the calculation result becomes the target code amount is selected.

The discard order table 52 shown in the example of FIG. 18 is created for 2-level wavelet transform (or decomposition);

however, any suitable discard order table may be created in accordance with the level of wavelet transform. FIG. 19 illustrates a set of coefficients after 2-level wavelet transform has been carried out. The coefficients of the 2LL subband can be expressed by 4-bit data as shown in FIG. 20A. The 4-bit data are further decomposed into four bit-planes shown in FIG. 20B. For example, the left-most matrix indicates the highest bit plane, while the right-most matrix indicates the lowest bit plane. Encoding is performed for each bit plane. The encoding result constitutes a code stream as shown in FIG. 21.

If discard pattern "1" or the subsequent pattern is selected, a portion of the code stream is discarded beginning from the least significant subband, and from the least significant bit plane, in accordance with the definition of the table.

The code discard unit 51 finally outputs a code stream from which a less significant portion of code data has been removed.

When the AC power source is used (or in the ordinary operation mode), the Lagragian rate control is performed by the rate control unit 26. The Lagragian rate control is a known technique (see Japanese Patent No. 3281423), and explanation for it is omitted here.

The image coder 21 according to this embodiment can efficiently control its power consumption. If the remaining charge of the battery has decreased to or below the threshold value, one or more process modes of the processing units of the image compression/encoding unit are adjusted so as to reduce workload. For example, the process mode of the tiling unit 23 is set to the non-overlap tiling mode. In addition or independently, the number of taps of the wavelet filter is set to 5-tap/3-tap, and the hierarchical level of the wavelet decomposition of the DWT unit 24 is set to 3-level wavelet decomposition. The output voltage of the variable voltage source 28 and the frequency of the clock signal are also reduced, thereby reducing power consumption of the image coder 21.

When the operation mode setting unit 31 accepts a user's selection of operation mode, the process modes of the associated components (units), including rate control, are adjusted, regardless of the remaining charge of the battery, to reduce power consumption.

To sum up, when the remaining charge of the battery 27 of the image coder 21 becomes insufficient, power consumption can be reduced by regulating rate control. In a preferable example, the rate control mode of the rate control unit is set to plain rate control mode to reduce power consumption.

Power consumption of the image coder 21 can also be reduced by adjusting the tiling mode. In a preferable example, the tiling mode of the tiling unit is set to the non-overlap tiling mode to reduce power consumption.

Power consumption of the image coder 21 can also be reduced by varying the number of taps of the wavelet filter and/or changing the wavelet decomposition level number. For example, the tap number of the wavelet filter may be set to 5-tap/3-tap, and/or the wavelet decomposition level may be set to 3-level wavelet decomposition.

In a preferable example, process modes, including rate control mode, may be adjusted, regardless of the remaining charge of the battery, by selecting an operation mode. The output voltage of the variable voltage source and the frequency of a clock signal may also be decreased to reduce power consumption.

Although, the present invention has been described using an example of coding and decoding video data, the present invention can be applied to coding and decoding any types of image data. For example, when digital still images of multiple scenes are successively taken, or when page images are displayed, while continuously turning the pages, the present invention can be applied efficiently to coding and decoding of such image data, while reduce power consumption.

This patent application is based on and claims the benefit of the earlier filing dates of Japanese Patent Application Nos. 2002-262243 filed Sep. 9, 2002, and 2002-345237 filed Nov. 28, 2002, the entire contents of which are hereby incorporated by reference.

The invention claimed is:

1. An image coder comprising:
    an image compression/encoding unit to divide an image into a plurality of tiles through a tiling process and perform compression and encoding of the image in a hierarchical manner for each of the tiles;
    a power supply state detector to detect a current state of a power supply of the image coder; and
    a first mode setting unit to select a tiling processing mode in accordance with the current state of the power supply, wherein the first mode setting unit selects an overlap tiling mode when the current state of the power supply is above a reference state and selects a non-overlap tiling processing mode when the current state of the power supply is at or below the reference state.

2. An image coder comprising:
    an image compression/encoding unit to perform compression and encoding of an image using wavelet transform for frequency transform;
    a power supply state detector to detect a current state of a power supply of the image coder; and
    a first mode setting unit to select a processing mode of wavelet transform in accordance with the current state of the power supply, and further comprising:
    a wavelet filter, wherein the first mode setting unit selects the number of taps of the wavelet filter in accordance with the current state of the power supply.

3. The image coder according to claim 2, wherein the first mode setting unit selects a 9-tap/7-tap filter when the current state of the power supply is above a reference state, and it selects a 5-tap/3-tap filter when the current state of the power supply is at or below the reference state.

4. The image coder according to claim 2, wherein the first mode setting unit selects a hierarchical level of wavelet transform in accordance with the current state of the power supply.

5. The image coder according to claim 4, wherein the first mode setting unit selects a 5-level wavelet transform when the current state of the power supply is above a reference state and selects a 3-level wavelet transform when the current state of the power supply is at or below the reference state.

6. An image coder comprising:
    image compression/encoding means for performing compression and encoding of an image using wavelet transform for frequency transform;
    detection means for detecting a remaining battery level when a power supply of the image coder is a battery cell; and
    first setting means for designating a rate control mode of the compression and encoding in accordance with the detected battery level,
    wherein the first setting means designates a Lagragian rate control more when the remaining battery level is above a reference level designates a plain rate control mode when the detected battery level is at or below the reference level.

7. An image coder comprising:
    image compression/encoding means for dividing an image into a plurality of tiles through a tiling process and for performing compression and encoding of the image in a hierarchical manner for each of the tiles;

detection means for detecting a remaining battery level when a power supply of the image coder is a battery cell; and first setting means for designating a tiling processing mode in accordance with the detected battery level, wherein the first setting means designates an overlap tiling mode when the remaining battery level is above a reference level designates a non-overlap tiling processing mode when the remaining battery level is at or below the reference level.

8. An image coder comprising:

image compression/encoding means for performing compression and encoding of an image using wavelet transform for frequency transform;

detection means for detecting a remaining battery level when a power supply of the image coder is a battery cell; and first setting means for setting a number of taps of a wavelet filter used for the wavelet transform in accordance with the detected battery level, wherein the first setting means designates a 9-tap/7-tap filter when the detected battery level is above a reference level designates a 5-tap/3-tap filter when the detected battery level is at or below the reference state.

9. An image coder comprising:

image compression/encoding means for performing compression and encoding of an image using wavelet transform for frequency transform;

detection means for detecting a remaining battery level when a power supply of the image coder is a battery cell; and first setting means for designating a hierarchical level of the wavelet transform in accordance with the detected battery level, wherein the first setting means designates a 5-level wavelet transform when the detected battery level is above a reference state designates a 3-level wavelet transform when the detected battery level is at or below the reference level.

10. The image coder according to claim 6, further comprising:

second setting means for designating a tiling mode or the rate control mode of the compression and encoding, regardless of the mode designated by the first setting means.

* * * * *